United States Patent [19]
Aimoto et al.

[11] Patent Number: 6,144,636
[45] Date of Patent: Nov. 7, 2000

[54] PACKET SWITCH AND CONGESTION NOTIFICATION METHOD

[75] Inventors: Takeshi Aimoto, Sagamihara; Takeki Yazaki, Ebina, both of Japan

[73] Assignee: Hitachi, Ltd., Tokyo, Japan

[21] Appl. No.: 08/986,513

[22] Filed: Dec. 8, 1997

[30] Foreign Application Priority Data

Dec. 6, 1996 [JP] Japan ................................. 8-326492

[51] Int. Cl.⁷ ................................................ H04L 12/28
[52] U.S. Cl. ........................................... 370/229; 370/232
[58] Field of Search ................................. 370/218, 230, 370/232, 233, 234, 235, 237, 389, 395, 229

[56] References Cited

U.S. PATENT DOCUMENTS

| | | | |
|---|---|---|---|
| 5,090,011 | 2/1992 | Fukuta et al. | 370/230 |
| 5,555,823 | 8/1996 | Irie . | |
| 5,699,345 | 12/1997 | Watanuki et al. | 370/232 |
| 5,764,641 | 6/1998 | Lin . | |
| 5,822,540 | 10/1998 | Caldera . | |
| 5,838,677 | 11/1998 | Kozaki et al. | 370/389 |
| 5,914,936 | 6/1999 | Hatono et al. | 370/230 |
| 5,936,958 | 8/1999 | Soumiya et al. | 370/395 |

OTHER PUBLICATIONS

*The ATM Forum Technical Committee,* Traffic Management Specification v4.0, af–tm–0056.000 Letter Ballot, Apr., 1996.

*Primary Examiner*—Chi H. Pham
*Assistant Examiner*—Brenda H. Pham
*Attorney, Agent, or Firm*—Antonelli, Terry, Stout & Kraus, LLP

[57] ABSTRACT

A packet switch for setting a connection between a transmission source of a packet and a reception destination thereof so as to perform communication. The invention includes a packet buffer which includes at least one input port and a plurality of output ports. An input packet from the input port is delivered to at least one output port in accordance with address information of the input packet and connection information having been set in the packet switch at the time of setting the connection between the transmission source and the reception destination. A bandwidth management packet for giving notice of a congested state of the packet switch is transferred on the connection. The invention further includes a register which holds threshold value information for indicating an amount of use of the packet buffer that causes congestion, a counter which provides a count representative of a current amount of use of the packet buffer, a comparator which compares the count from the counter and the threshold value information from the register and outputs a result of the comparison, and a congestion decision/notification circuit which writes congestion notification information into the bandwidth management packet based on a result of the comparison by the comparator.

42 Claims, 12 Drawing Sheets

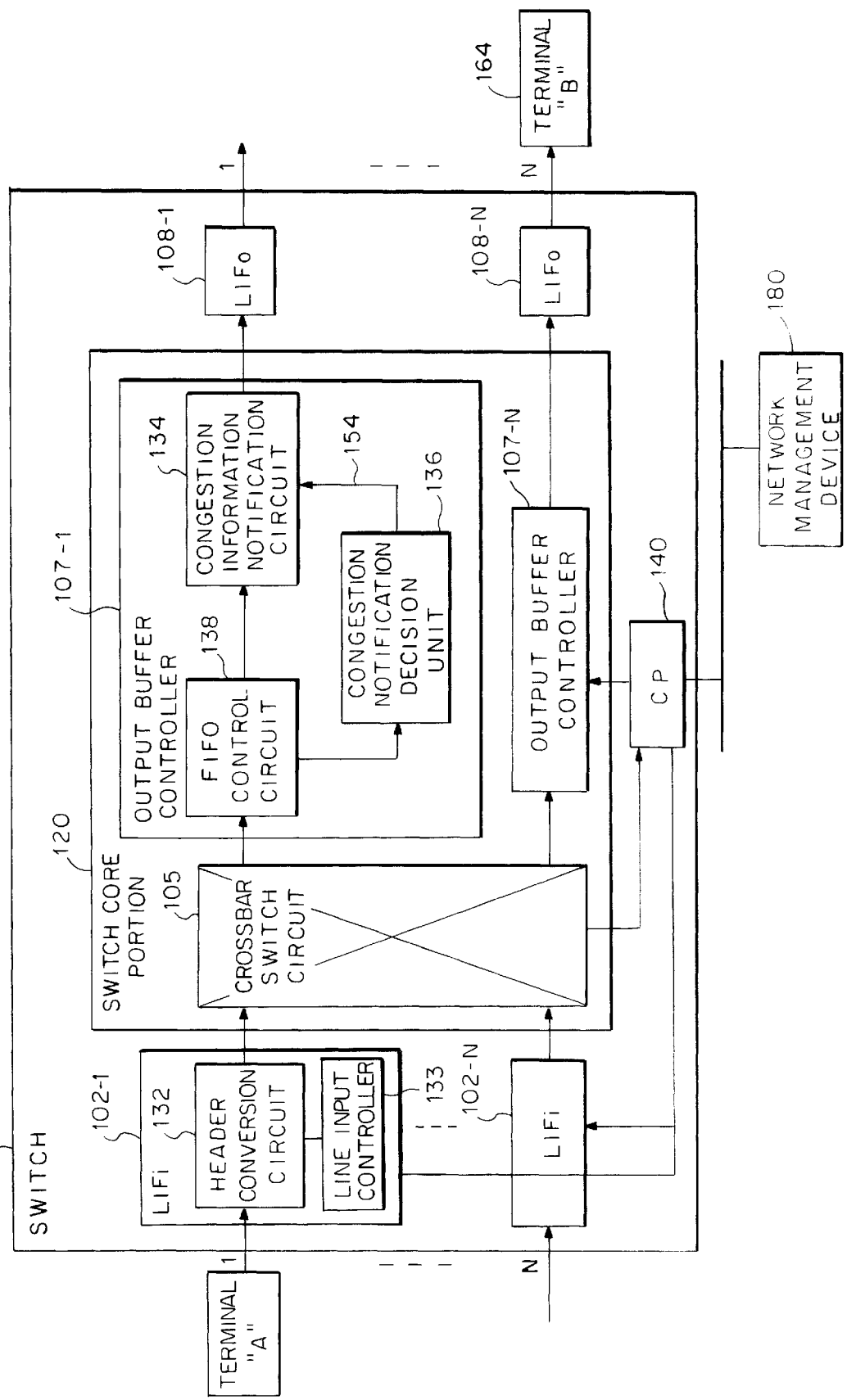

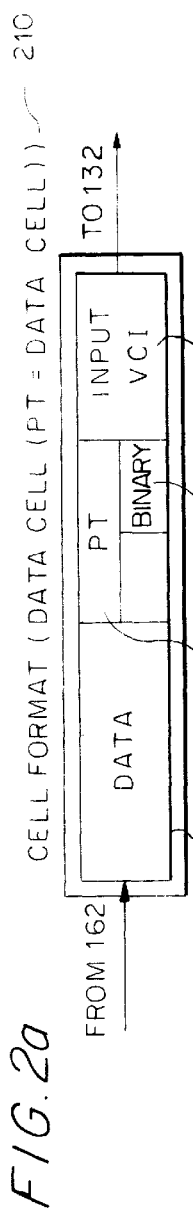
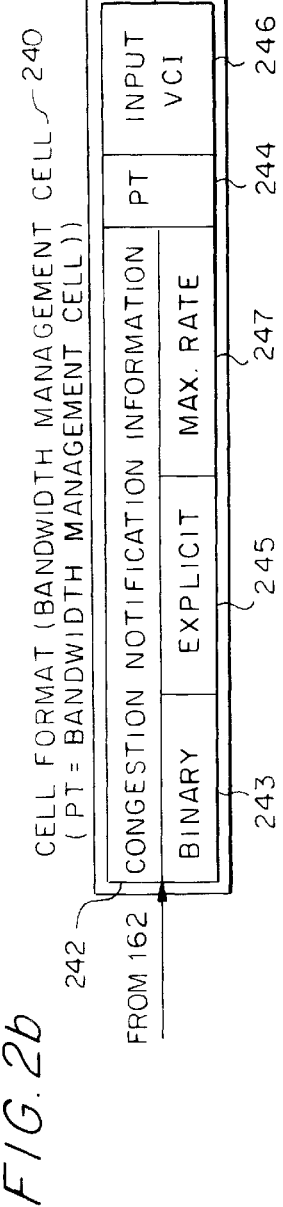
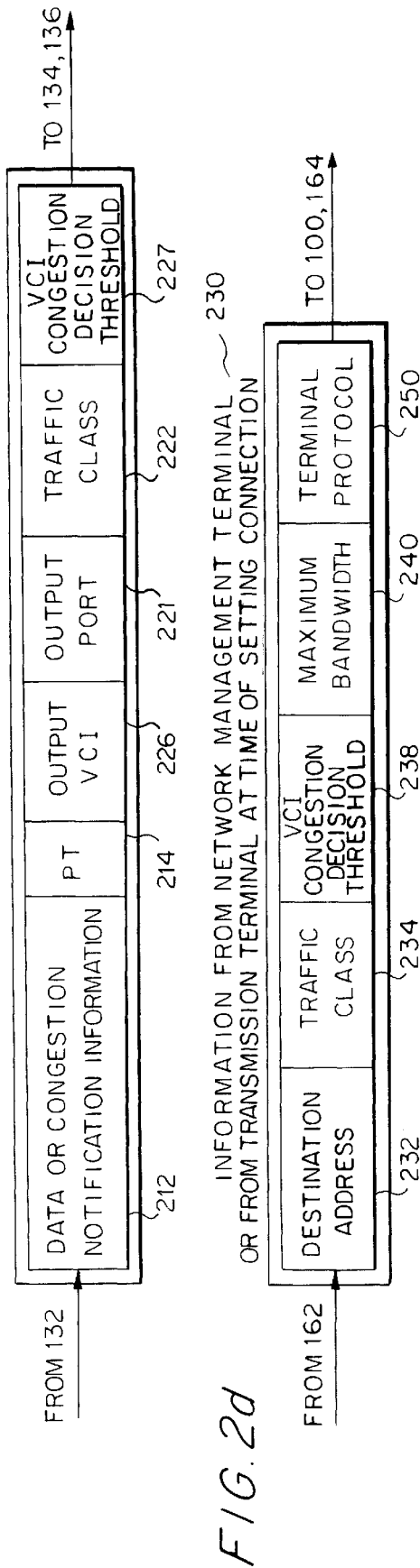
FIG.2a  FIG.2b  FIG.2c  FIG.2d

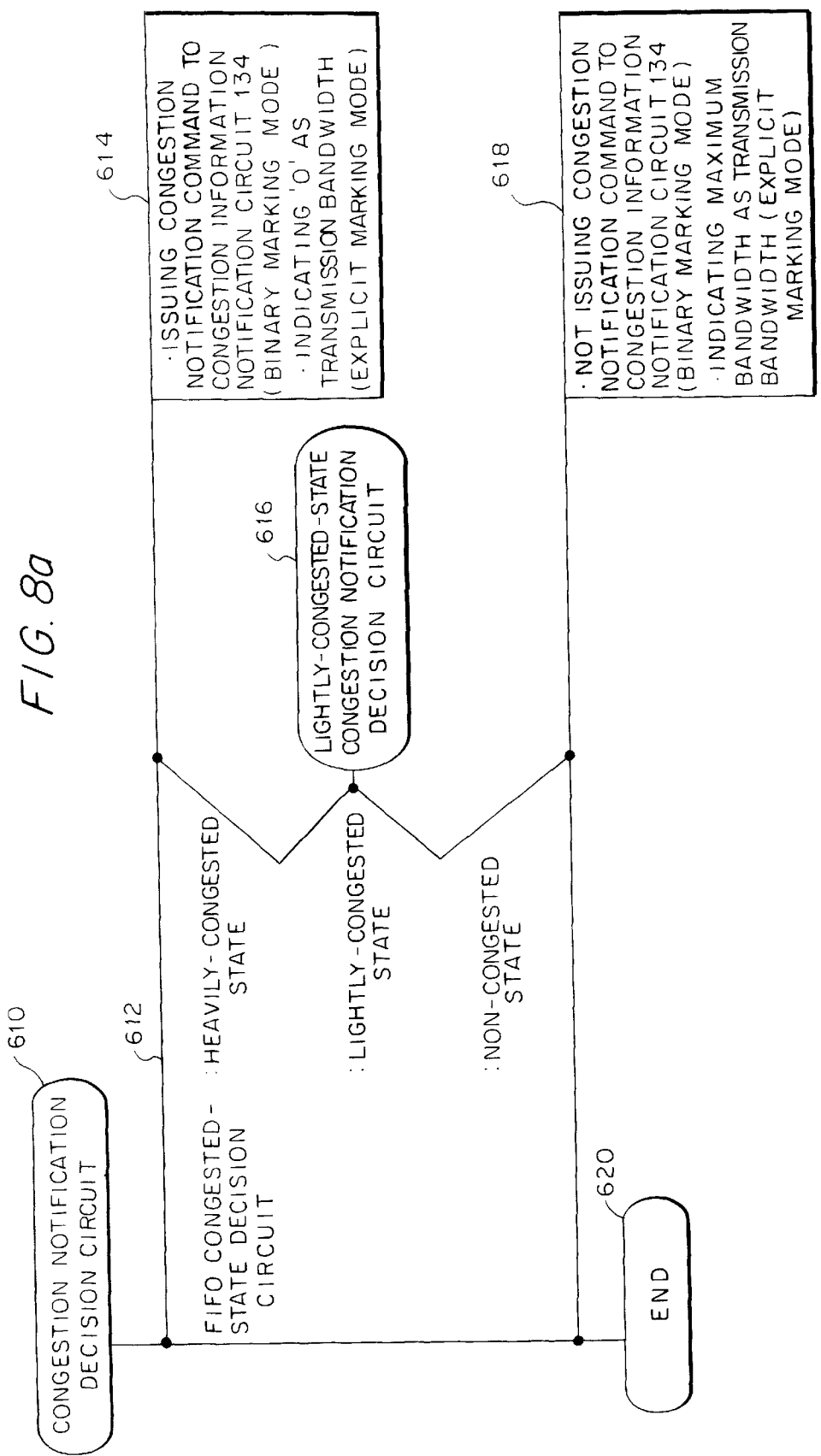

FIG. 9

BEHAVIOR OF CONGESTION NOTIFICATION CIRCUIT 410
CASE OF BINARY MARKING MODE

| # | INPUT OF CIRCUIT 410 | | OUTPUT OF CIRCUIT 410 |
|---|---|---|---|
|   | LINE 443 FIFO CONGESTION DEGREE | LINE 442 VC CONGESTION DEGREE | LINE 154 CONGESTION MARKING |
| 1 | F = NON-CONGESTED STATE | $C \leq S'$ | NOT MARK |
| 2 |   | $C > S'$ |   |
| 3 | F = LIGHTLY-CONGESTED STATE | $C \leq S'$ | NOT MARK |
| 4 |   | $C > S'$ | MARKING |
| 5 | F = HEAVILY-CONGESTED STATE | $C \leq S'$ | MARKING |
| 6 |   | $C > S'$ |   |

FIG. 10

BEHAVIOR OF CONGESTION NOTIFICATION CIRCUIT 410
CASE OF EXPLICIT MARKING MODE (SIMPLIFIED RATE METHOD)

| # | INPUT OF CIRCUIT 410 | | OUTPUT OF CIRCUIT 410 |
|---|---|---|---|
|   | LINE 443 FIFO CONGESTION DEGREE | LINE 442 VC CONGESTION DEGREE | LINE 154 CONGESTION MARKING |
| 1 | F = NON-CONGESTED STATE | $C \leq S'$ | M |
| 2 |   | $C > S'$ |   |
| 3 | F = LIGHTLY-CONGESTED STATE | $C \leq S'$ | M |
| 4 |   | $C > S'$ | M / 2**F |
| 5 | F = HEAVILY-CONGESTED STATE | $C \leq S'$ | 0 |
| 6 |   | $C > S'$ |   |

FIG. 14

BEHAVIOR OF CONGESTION NOTIFICATION CIRCUIT 470
CASE OF EXPLICIT MARKING MODE (FAIR RATE METHOD)

| # | INPUT OF CIRCUIT 470 | | OUTPUT OF CIRCUIT 470 |
|---|---|---|---|
|   | LINE 443 FIFO CONGESTION DEGREE | LINE 442 VC CONGESTION DEGREE | LINE 154 CONGESTION MARKING |
| 1 | F = NON-CONGESTED STATE | $C \leq S'$ | M |
| 2 |   | $C > S'$ |   |
| 3 | F = LIGHTLY-CONGESTED STATE | $C \leq S'$ | M |
| 4 |   | $C > S'$ | U / ACTIVE VCI NUMBER |
| 5 | F = HEAVILY-CONGESTED STATE | $C \leq S'$ | 0 |
| 6 |   | $C > S'$ |   |

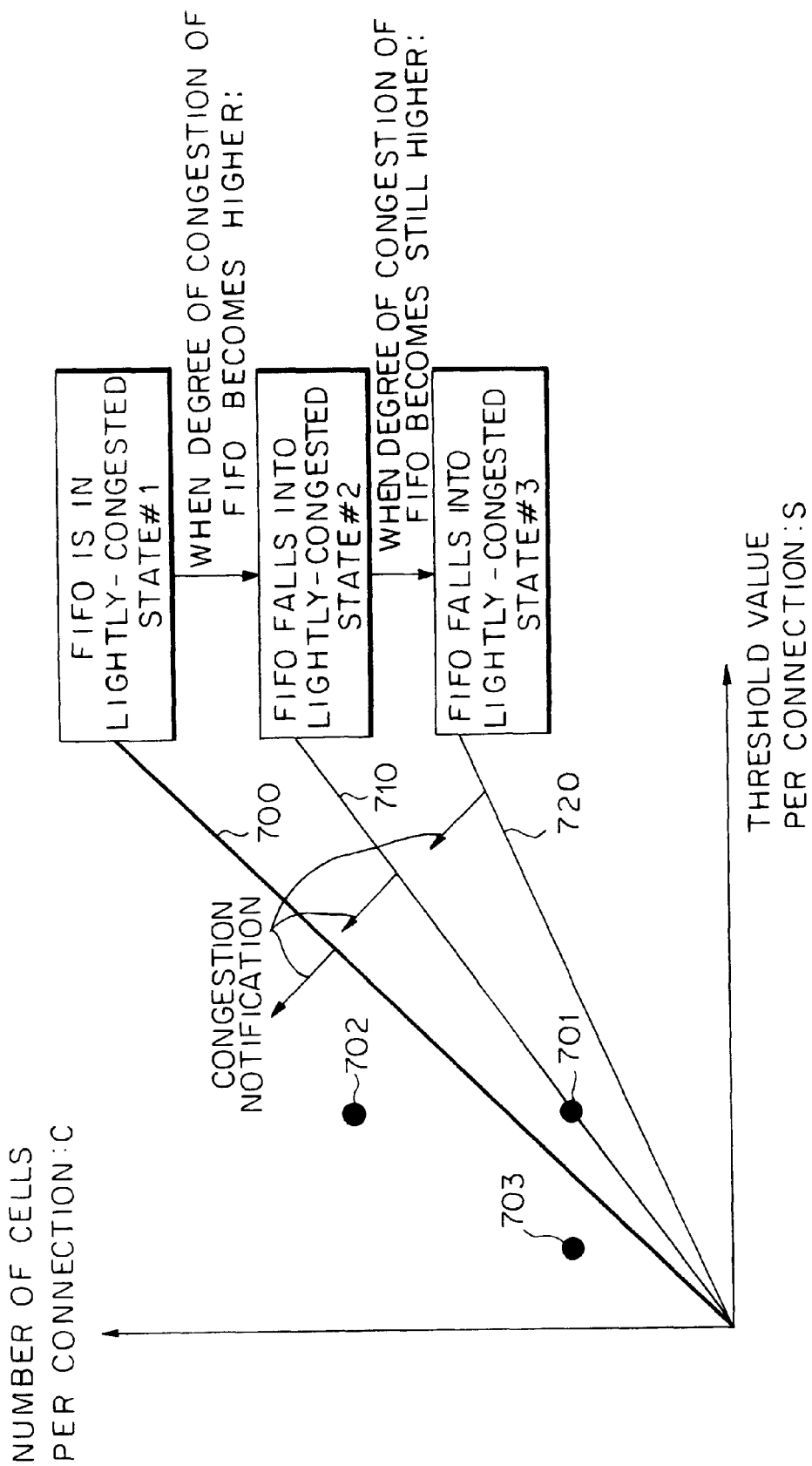

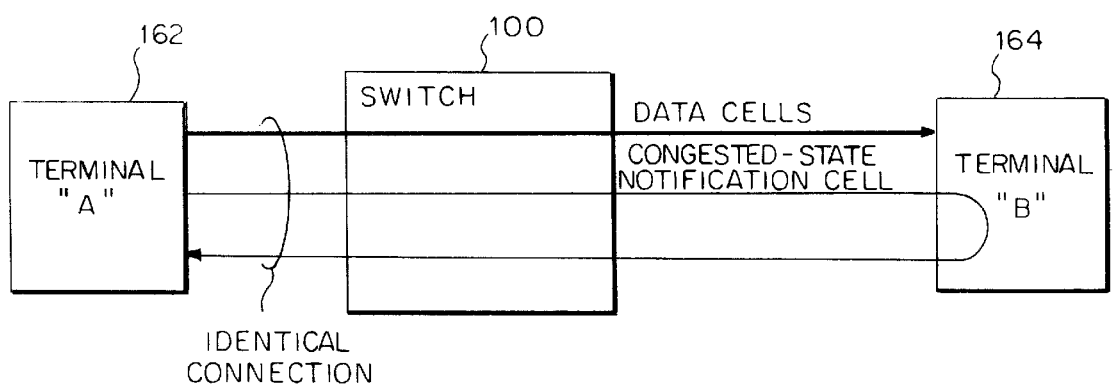
F/G. 16

PACKET SWITCH AND CONGESTION NOTIFICATION METHOD

BACKGROUND OF THE INVENTION

The present invention relates to a congestion control method for use in a packet switch. More particularly, the present invention relates to a method and apparatus for controlling congestion in a packet switch based on a threshold value which indicates the amount of volume that causes congestion.

As a first conventional technique there is packet transferring technology known as Asynchronous Transfer Mode (ATM). The word "packet" referred to herein corresponds to a cell in the ATM. The ATM is also one example of packet switching technology in a broad sense. An ATM is disclosed, for example, in "Data Communication Using ATM: Architecture, Protocols, and Resource Management", IEEE Communication Magazine, August 1994, pp 24–31.

In an ATM connection information is set by a signalling process for a route which transfers each cell (or fixed-length packet). The route extends from a transmission source to a reception destination via switches. After completion of the signalling process, the cell is transferred on the route for which a connection has been set.

The connection information is stated in accordance with, for example, "Q.2931 3.Message function definitions and contents". Included in the connection information are identifiers which serve to identify the connection on each of the links between the transmission source and the switch, and between the switch and the reception destination; and traffic classes which indicate the priority levels of the cell transfer within the switches, etc. The identifiers are called the "VPI (Virtual Path Identifier)" and the "VCI (Virtual Connection Identifier)", and they become the address information of the header of the cell.

The transfer of the cell will be explained below. Upon receiving the cell, the switch reads out the connection information necessary for the cell transfer as set by the connection process based on the VPI and VCI of the received cell. The items of the necessary connection information are, for example, the number of an output port, an identifier at the time of output of the cell, and the traffic class indicative of the priority level of the cell within the switch.

Examples of different traffic classes are as follows: UBR (Unspecified Bit Rate) traffic class is a traffic class in which a network guarantees nothing as to the transfer of the cell. ABR (Available Bit Rate) traffic class is a traffic class in which a feedback control is performed as to a congested state between a network and a terminal so as to guarantee the prevention of cell loss. VBR (Variable Bit Rate) traffic class is a traffic in which the network allows for cells to be transferred at a rate that varies over time. CBR (Constant Bit Rate) traffic class is a traffic class in which a fixed amount of bandwidth is continuously made available by the network to transfer cells.

The ABR traffic class is disclosed in "The Rate-Based Flow Control Framework for the Available Bit Rate ATM Service", IEEE Network March/April 1995 pp 25–39, or in ATM JIG News Letter Vol.2, No.2, pp 2–3. As described in this reference in the ABR traffic class, a bandwidth management cell called the "RM (Resource Management) cell" is occasionally sent by the transmission terminal within the same connection as that of the data cell. The bandwidth management cell is returned to the terminal again via the switch within the network and a reception terminal. In this regard, when either of the network switch or the reception terminal is in the congested state, it writes congestion notification information into the bandwidth management cell. Thus, the transmission side terminal is accordingly notified of the congested state, and it suppresses the transmission rate thereof. Accordingly, the occurrence of cell discard within the network can be prevented.

FIG. 16 illustrates the control of the ABR traffic class which is the feedback-type congestion control. Within the identical connection, the congested-state notification cell (bandwidth management cell) is periodically transmitted every predetermined number of data cells. The bandwidth management cell is sent back to the transmission source terminal "A" 162 by the reception destination terminal "B" 164. The switch 100 or the reception destination terminal "B" 164 writes control information into the congestion notification indication 242 of the bandwidth management cell 240 based on its congested state as illustrated in FIG. 2B. The transmission source terminal "A" 162 having received the bandwidth management cell with the congestion notification indication 242 adjusts the transmission rate in accordance with the indication.

The congestion notification indication for the bandwidth management cell is divided into a binary marking mode wherein the transmission source terminal is notified of only the indication of increase or decrease in a bandwidth, and an explicit marking mode wherein the transmission source terminal is notified of an allowed transmission bandwidth.

The binary marking mode also includes a mode wherein the congestion notification indication is written into the data cell not the transmitted bandwidth management cell and the congestion notification indication is reflected in a bandwidth management cell to-be-looped-back in the reception side terminal.

A second conventional technique of a switch of the asynchronous transfer mode is disclosed in, for example, Japanese Patent Application Laid-open No. 197128/1994 entitled "Packet Switching Technology". According to the switch stated in "Packet Switching Technology", buffers such as RIRO type input buffers and FIFO type output buffers are included in the switch, and an input buffer control unit determines a cell which is to be delivered from the RIRO type input buffer in the next time slot, based on table information which indicates the empty state of the output buffer.

In the asynchronous transfer mode, a connection is first set, and a cell is thereafter sent out. An identifier for identifying communication in the identical connection is included in the header of the cell being transferred. The switch changes-over routes based on the identifier and information which has been set within the switch at the time of the setting of the connection.

In the second conventional technique a portion associated with output lines has the output buffers respectively disposed for two traffic classes namely CBR and VBR, and table information is held in order to indicate the empty states of the two buffers for each of output ports. A portion associated with input ports has the input buffers disposed respectively for the two traffic classes CBR and VBR, and respectively for the output ports of the class VBR. The output priority level of the CBR buffer is set higher than that of the VBR buffer, whereby the communication delay time of the traffic class CBR as is severely restricted is permitted to become shorter than a certain time. Further, in a case where the CBR buffer is full, the cell is transferred to the VBR buffer having an empty address (which is often existent ordinarily), whereby the effective utilization of the bandwidth of the switch is attained. Incidentally, the traffic classes ABR and UBR can be supported, for example, in such a way that output buffers corresponding to these traffic classes are disposed in addition to the output buffers of the traffic classes CBR and VBR in the switch of the known example.

A third conventional technique of a switch of the asynchronous transfer mode is disclosed in B-598 "Development of 622 Mbps 8×8 ATM Switch LSI having Delay Priority Control Function for 5 Classes", '96 National Meeting of the (Japan) Institute of Electronics, Information and Communication Engineers. The paper B-598 in the '96 National Meeting of the Institute of Electronics, Information and Communication Engineers discloses an architecture wherein a cell accumulating buffer common to a plurality of output ports is disposed instead of physically independent buffers for respective output ports. Further, the paper discloses a technique wherein information on a cell number counter for each traffic class and information on a threshold value for each traffic class are held within the switch. The notification of congestion is made when the value of the cell number counter has exceeded the threshold value.

The architecture of a fourth conventional technique of a switching system for handling ATM cells, in which a cell accumulating buffer common to a plurality of output ports is disposed in the same manner as in the third conventional technique is detailed in, for example, Japanese Patent Application Laid-open No. 276943/1992.

In the switching techniques described above as the second, third and fourth conventional techniques there is no disclosure concerning the cell transferring technique for the connection of the ABR traffic class referred to in the first conventional technique.

When an output port has fallen into a congested state, a switch detects the congested state, and it writes congestion notification information into a bandwidth management cell which is transferred on a connection made according to the ABR traffic class. In realizing a switch adapted to support the ABR traffic class, however, the capabilities of the traffic control (such as throughput, cell discard ratio, the number of supportable connections, a supportable transfer length, the fairness among connections, and securing the bandwidth of a designated connection) differ greatly depending upon methods which initiating the above operations in the switch. In turn, the initiating methods in the switch depend greatly upon a method for detecting the congested state, a connection selection method for selecting the notifying connection from among a plurality of connections, a generation method for generating the congestion notification information from detected congestion information, etc., so that these methods are important.

In the binary marking mode, it becomes important to initiate a fairness guaranteeing control in which the notifying connection is selected so that the respective transfer rates of the plurality of connections utilizing the ABR traffic class may become equal to one another even on the occasion of the congestion. Also initiated is a bandwidth securing control in which the connection is selected by weighting so that, contrary to the above, a bandwidth may be preferentially assigned to an appointed specific connection.

SUMMARY OF THE INVENTION

A first object of the present invention is to initiate in a switch fairness guaranteeing control and bandwidth securing control when supporting the ABR traffic class of the binary marking mode.

A second object of the present invention is to execute a congestion notification corresponding to the degree of congestion and the number of active connections, for the purpose of attaining a high throughput within limits in which no cell discard takes place.

The present invention provides a packet switch for setting a connection between a transmission source of a packet and a reception destination thereof so as to perform communication. The present invention includes a packet buffer which includes at least one input port and a plurality of output ports. An input packet from the input port is delivered to at least one output port in accordance with address information of the input packet and connection information having been set in the packet switch at the time of setting the connection between the transmission source and the reception destination. A bandwidth management packet for giving notice of a congested state of the packet switch is transferred on the connection. The present invention further includes a register which holds threshold value information for indicating an amount of use of the packet buffer that causes congestion, a counter which provides a count representative of a current amount of use of the packet buffer, a comparator which compares the count from the counter and the threshold value information from the register and outputs a result of the comparison, and a congestion decision/notification circuit which writes congestion notification information into the bandwidth management packet based on a result of the comparison by the comparator.

In order to accomplish the first object the present invention provides a congestion notification circuit which executes congestion notification based on a threshold value corresponding to a congested state, only when a cell buffer has fallen into the congested state, thereby enhancing the throughput of the ABR traffic class of the binary marking mode.

In the explicit marking mode, when congestion notification information is to be generated with respect to a transmission bandwidth of a transmission terminal it becomes important to initiate a fairness guaranteeing control in which the respective transfer rates of the plurality of connections utilizing the ABR traffic class are equally assigned to the connections even on the occasion of the congestion. Further, a bandwidth securing control is initiated in which weighting is performed so that, contrary to the above, a bandwidth may be preferentially assigned to an appointed specific connection.

In order to accomplish the second object, the present invention initiates in a switch the fairness guaranteeing control and the bandwidth securing control for the bandwidth indication when supporting the ABR traffic class of the explicit marking mode.

A time interval RTT: Round Trip Time in which an RM cell is sent out by a transmission side terminal and is sent back to the transmission side terminal again via a reception side terminal, and a bandwidth, for example, the maximum transfer rate PCR: Peak Cell Rate differ in individual connections. In a connection of long distance transfer, the RTT becomes long, and hence, the controllability of the throughput as well as congestion control is liable to degrade. Accordingly, it becomes important that, when congestion has occurred, it is detected and marked early. Thus, it is required that the conditions of a congestion decision and the value of a bandwidth can be altered for the individual connections.

The present invention provides apparatus for subjecting the respective connections of different RTTs or bandwidths, to ABR traffic controls in consideration of the environmental conditions of the connections and the priority levels thereof.

It is preferable to perform with software a control in which the alteration of a control condition, etc. considering the environmental condition and priority level of each connection are taken into account. In this case, however, there has been the problem that the input rate of cells lowers depending upon the processing speed of the software, so controllability and line speed are incompatible. There has also been the problem that, when the software processing is introduced, the processors, memories etc. of respective congestion processing units are required, so increase in cost is involved.

The present invention inexpensively provides apparatus which attains high controllabilities even for the congestion controls of respective connections while a high-speed line is being processed in the ABR traffic class by hardware processing.

The control of the ABR traffic class includes the suppression of the transmission rate of a transmission terminal. Therefore, even when the condition of the congestion notification is met in the congestion decision of every connection, the congestion notification should more preferably be avoided in a case where the buffer of an output port is not in a congested state. To the contrary, even when the condition of the congestion notification is not met in the congestion decision of every connection, the buffer of every output port falls into the congested state in spite of the low degree of congestion of individual connections in a case where the number of active connections is large. On such an occasion, accordingly, the congestion detection and the congestion notification must be performed. When the number of active connections is large, the bandwidth of every connection is already narrow. Therefore, even when the congestion notification is executed, the effect thereof is restricted, and a time period for recovery from the congestion extends. On such an occasion, accordingly, the congestion detection and the congestion notification must be performed at an early stage.

The present invention provides apparatus for performing a control based on the conditions of the buffer within a switch and the whole network. Particularly, the apparatus performs a control based on number of active connections within a network while attaining high controllability for the control of respective connections concerning congestion.

When the traffic of the data type is transferred by a switch, the prediction of the effect on the traffic is difficult. In this regard, when the network resources are to be managed so as to maintain a preferable communication quality even at the occurrence of congestion, it is required to monitor the situation of cell transfer within the switch by a network management device and to add network switching elements and reset connections before the communication quality decreases due to an increase in a traffic volume.

With respect to the first and second objects of the present invention, even when execution of the bandwidth securing control in the ABR traffic class has been set, readjustment or resetting such as making the congestion notification of a connection of low priority level still earlier is required when the communication quality decreases due to the increase in the traffic volume.

The present invention provides apparatus for monitoring the conditions of congestion and setting congestion control parameters in connection units by a network management device, for a switch which performs congestion controls in connection units.

When the binary marking mode is used the present invention provides at least the following apparatus in a switch.

Cell-number counter information and threshold value information of every connection are held in the switch. A comparator is provided for every connection for deciding whether the value of a cell number counter has exceeded a threshold value. Further, the cell-number counter information and the threshold value information of all of the output ports are held in the switch. A congested-state decision circuit is provided for deciding whether a congestion state exists in the output ports. A congestion notification/decision circuit is provided for receiving a notification of a congested state from the congested-state decision circuit, and for deciding whether the congestion notification is to be based on result information from the comparator which indicates when the threshold value information items of the respective connections have increased or decreased at equal proportions based on the value of the connection number counter.

A congestion notification circuit is provided for receiving a congestion notification command from the congestion notification/decision circuit, and for inserting a congestion notification in a bandwidth management cell sent to the switch. The congestion notification circuit includes a shifter by which the maximum bandwidth information determined in a transmission bandwidth indicator field within the bandwidth management cell at the time of setting the corresponding connection is shifted based on the command given from the congestion notification/decision circuit. In the congestion notification/decision circuit a congestion-notification decision circuit is included for deciding whether the indication of congestion from the congestion notification indication circuit of every connection is to be performed in compliance with notification of the congested state as per the congested-state decision circuit for all of the output ports, or whether the congestion notification is to be immediately performed.

When the explicit marking mode is used the present invention provides at least the following apparatus in the switch.

The cell-number counter information and the threshold value information of every connection are held in the switch, and a comparator is provided for every connection for deciding whether or not the value of a cell number counter has exceeded a threshold value.

The present invention further provides a connection number counter counts the number of active connections, a target bandwidth information register in which target bandwidth information for the output port is held, and a divider which divides the target bandwidth information by the value of the number of connections.

A congestion notification circuit is provided for performing the following control. When the result of the comparison indicates the value of the cell number counter exceeds the threshold value, the output value of the divider is compared with the value of an explicit rate information field within a bandwidth management cell having been input to the switch, and the greater value is selected. Then the value of the explicit rate information field within the bandwidth management cell having been input to the switch is written into the bandwidth management packet of the corresponding connection. When the result of the comparison indicates that the value of the cell number counter does not exceed the threshold value, the value of the explicit rate information field is not altered.

When the binary marking mode, the switch operates as described below.

The fairness guaranteeing control will be described below by way of example.

It is assumed that connections A and B are set in the network, and the transmission rate of the connection A is higher. When operating the network so as to equalize the throughput of the connections, equal values are set as the threshold value information items of the respective connections in the switch. When congestion has occurred, the cell-number counter information of the connection A first exceeds the threshold value, and the congestion notification is preformed. Thus, the transmission rate of the connection A is lowered and the connection recovers from the congested state. When the congested state continues to occur, the cell-number counter information of a higher rate, including the rate of the connection A having been lowered and the rate of the connection B, exceeds the threshold value. Thus, the congestion notification is performed. In this manner, the switch operates so as to equally eliminate the congested states of the respective connections, thereby guaranteeing the fairness of the transmission rates.

Further, the threshold value information items of the respective connections are increased or decreased at equal proportions based on the congested-state decision circuit for all of the output ports and the connection number counter, thereby accelerating the congestion notification and the recovery from the congestion. The fairness of the transmission rates is guaranteed while cell discard is prevented. When the decisional conditions based on the congested-state decision circuit for all of the output ports and the connection number counter do not indicate a congested state, the switch operates so as not to execute the congestion notification irrespective of the result of the comparator for every connection, thereby guaranteeing high throughput of the output port.

The bandwidth guaranteeing control will be described. It is assumed that the set bandwidth of the connection A is higher.

When congestion has occurred in the state in which the transmission terminals of the connections A and B are sending cells with equal transmission bandwidths, the cell number counter information of the connection B first exceeds the threshold value, followed by the execution of the congestion notification and the lowering of the transmission rate. Since the connection A is not notified of the congestion, the bandwidth of connection A is guaranteed.

In both the fairness guaranteeing control and the bandwidth guaranteeing control, the switch operates so as not to execute the congestion notification, in the state in which the output port in the switch is not congested. Therefore, the throughput of the output port is ensured.

When the explicit marking mode is used in the present invention the switch operates as described below.

The fairness guaranteeing control will be described below by way of example.

It is assumed that connections A and B are set in the network, that the transmission rate of the connection A is higher, and that the connections are transmitting cells at the same time.

When the value of the connection number counter is 2, equal values are obtained by dividing the target bandwidth information by the value 2. The number of connections are written into the explicit rate information fields of the bandwidth management cells of the connections A and B. In this manner, the switch operates so as to equally eliminate the congested states while keeping the bandwidths of the respective connections equal, thereby to guarantee the fairness of the transmission rates. When the threshold value information items of the connections A and B are set at a small value (for example, 0) the small values does not affect the result of the above division.

The bandwidth guaranteeing control will be described. It is assumed that the set bandwidth of the connection A is higher.

Information of the allowable number of buffered cells is held in the threshold value information of the connection A. When congestion has occurred in the state in which the transmission terminals of the connections A and B are sending cells with equal transmission bandwidths, the cell number counter information of the connection B first exceeds the threshold value, and the output value of the divider is written into the explicit rate information field, The congestion notification is executed, and the transmission rate is lowered. Since the connection A is not notified of the congestion, the bandwidth of the connection A is guaranteed.

BRIEF DESCRIPTION OF THE DRAWINGS

The present invention will be more apparent from the following detailed description, when taken in conjunction with the accompanying drawings, in which:

FIG. 1 is a block diagram of an embodiment of the present invention conforming to an individual-output-buffer method;

FIGS. 2A–2D are diagrams for explaining the cell format of a data cell, the cell format of a bandwidth management cell, an internal cell format, and connection information at the time of setting a call in the present invention;

FIGS. 8A and 8B are flowcharts for explaining the operation of the output buffer controller 107;

FIG. 9 is a table for explaining the operation of a congestion notification decision circuit 410 in a binary marking mode;

FIG. 10 is a table for explaining the operation of the congestion notification decision circuit 410 in an explicit marking mode using the a simplified rate method;

FIG. 11 is a graph for explaining the congestion control operation of the output buffer controller 107;

FIG. 14 is a table for explaining the operation of the congestion notification decision circuit 470 in the explicit marking mode using the fair rate method;

FIG. 16 is a block diagram showing a feedback-type traffic control.

DESCRIPTION OF THE PREFERRED EMBODIMENTS

Figure 3:
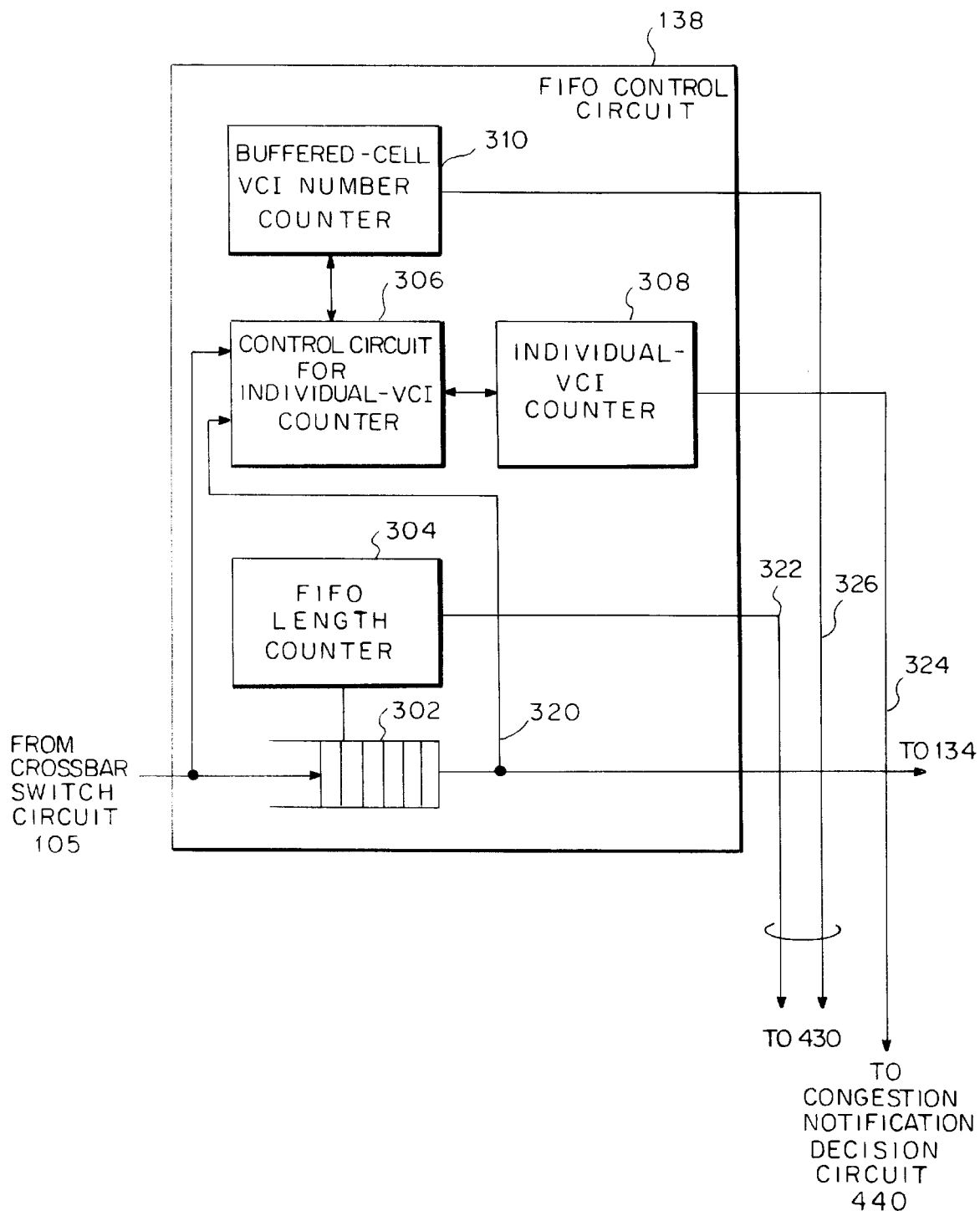
FIG. 3 is a block diagram for explaining an embodiment of a FIFO control circuit 138.

As an embodiment of the present invention, the entire architecture of a network constructed of a switch 100 and terminals 162, 164 is illustrated in FIG. 1. Although an actual network is often constructed of a plurality of switches and at least three terminals, only one switch 100 and only the terminal-A 162 and terminal-B 164 are shown for the sake of brevity in FIG. 1. However, the present invention is not limited to the example illustrated in FIG. 1. A network management device 180 is provided for managing the network.

The switch 100 is configured of line input control portions LIFi 102, a switch core portion 120, line output control portions LIFo 108 and a call setting control portion CP 140. A header conversion circuit 132 and a line input controller 133 for controlling the line input control portion 102 including the header conversion circuit are included in each of the line input control portions LIFi 102. The switch core portion 120 is configured of a crossbar switch circuit 105 and output buffer controllers 107. Each of the output buffer controllers 107 including a FIFO control circuit 138, a congestion notification decision unit 136 and a congestion information notification circuit 134.

The following is a description of the operation of the whole network constructed of the switch 100 and the terminals 162, 164. Specifically the description below will explain a case where a communication is transferred from the terminal-A 162 toward the terminal-B 164 via the switch 100.

A connection is established before the cell transferring operation. After the connection has been established, the terminal-A 162 sends out cells. The establishment of the connection can be performed by either a Switched Virtual Connection (SVC) call processing where the terminal in which a transmission request has occurred, and which is the terminal-A 162 here, sets the connection up to the terminal-B 164 via the switch 100, or Permanent Virtual Connection (PVC) call processing where the connection is set beforehand by the network management device 180.

First, SVC call processing will be explained by way of example. As shown in FIG. 2D, connection information 230 at the time of setting a connection from a network management terminal or a transmission terminal is constructed by destination address information 232, traffic class information 234, VCI congestion notification threshold information 238, maximum bandwidth information 240, and upper protocol information 250 in the terminal. At the time of setting the connection from the terminal, the terminal-A sends the connection information 230 in FIG. 2D to the switch 100. The call setting control processor CP 140 of the switch 100 receives the connection information, it decides the propriety of the setting of the connection, and it sets the received connection information 230 in the header conversion circuit 132 and the output buffer controller 107 on condition that the setting is possible. Thereafter, the switch 100 sends the connection information to the terminal-B 164. After the connection has been established, the terminal-A 162 begins to send out cells 210, as illustrated in FIG. 2A, toward the terminal-B 164.

When PVC call processing is to be performed, the network management device 180 sends the connection information 230 to the switch 100, and the call setting control processor CP 140 sets the received connection information 230 similarly to the above.

Next, cell transferring operations on the connection will be explained. The cell formats of cells which are transferred on the connection will be explained in advance.

FIG. 2A illustrates the cell format of the data cell. The cell 210 is constructed by an input VCI 216, the cell header part of PT 214 indicative of the type of the packet, and a data part 212. Since FIG. 2A shows the data cell, the PT 214 has a value indicative of the data cell. FIG. 2B illustrates the cell format of the bandwidth management cell. In this case, PT 244 has a value indicative of the bandwidth management cell, and congestion notification information is contained in a data part 242. The congestion notification information includes the binary marking mode in which the transmission source terminal is notified of only the indication of an increasing or decreasing bandwidth, and the explicit marking mode in which the transmission source terminal is notified of an allowed transmission bandwidth. Here, the format includes a binary marking field 243, an explicit rate marking field 245 and a maximum rate field 247.

The binary marking mode also includes a mode wherein the congestion notification information is written into the data cell, and wherein it is reflected in the binary marking field 243 of the bandwidth management cell to-be-looped-back in the reception side terminal. A binary marking field 213 is a field for marking congestion by the use of the data cell.

The cell 210 or 240 having been input to the switch 100 is converted into the format 220 of an internal cell by the header conversion circuit 132 by using the input VCI 216 or 246 as a search key. The internal cell format 220 is shown in FIG. 2C. The internal cell 220 has the input VCI 216 of the input cell 210 replaced with an output VCI 226, and it further includes output port information 221, traffic class information 222 and VCI congestion notification threshold information 227.

The crossbar switch circuit 105 transfers the internal cell 220 to the corresponding output buffer control circuit 107 based on the output port information 221. The internal cell 220 transferred to the output buffer control circuit 107 is queued in the FIFO control circuit 138. When the internal cell is output from the FIFO control circuit 138, the congestion notification decision unit 136 decides the congestion of every corresponding connection. Subject to the decision of a congested state, the congestion information notification circuit 134 writes congestion information into the output cell from the FIFO control circuit 138 so as to reflect the congested state. When the output cell from the FIFO control circuit 138 is the bandwidth management cell, the congestion notification information is written into the binary marking field 243 or the explicit rate indicating field 245 so as to reflect the congestion, when a congestion has occurred. When the output cell from the FIFO control circuit 138 is the data cell, the congestion notification information is written into the binary marking field 213 so as to reflect the congestion, when a congestion has occurred.

When the congested state has not occurred in the switch 100, either of the congestion notification cell and the data cell passes without undergoing the congestion notification in the congestion information notification circuit 134, and it is sent by the output buffer FIFO controller 107 to the line output control portion LIFO 108. The line output control portion LIFo 108 converts the internal cell format 220 into the format 210 or 240 of the output cell, which is delivered to a line. The output cell is input to the terminal-B 164.

Next, the details of the congested-state indicating operation of the switch 100 will be described in conjunction with FIG. 3 which illustrates the arrangement of the FIFO control circuit 138 corresponding to the output line, FIG. 4 which illustrates the arrangement of the congestion notification decision unit 136, FIG. 5 which illustrates the arrangement of a FIFO congestion level decision circuit 430 as well as a VCI congestion level decision circuit 440 included in the congestion notification decision unit 136, and FIG. 8 which illustrates the operation of a congestion notification decision circuit 410 included in the congestion notification unit 136.

FIG. 3 illustrates an example of arrangement of the FIFO control circuit 138. The FIFO control circuit 138 includes a FIFO circuit 302, a FIFO length counter 304 as the congestion information of the FIFO circuit 302 being a buffer which is shared by all VCIs to be delivered to the corresponding output port, an individual-VCI counter 308 which indicates the number of buffered cells in the FIFO circuit 302 for every VCI, a control circuit 306 for the individual-VCI counter, and a buffered-cell VCI number counter 310 which indicates the number of the VCIs having the buffered cells in the FIFO circuit 302.

The FIFO length counter 304 indicates the buffer use state of the whole FIFO circuit 302. It counts up when the cell is input thereto from the crossbar switch circuit 105, while it counts down when the cell is output to the congestion information notification circuit 134. Thus, the current value of the number of cells is held for every VCI. The status of the FIFO length counter 304 is sent to the FIFO congestion level decision circuit 430 via a signal line 322.

Likewise, the current value of the number of cells of every VCI being buffered in the FIFO circuit 302 is held by the individual-VCI-counter control circuit 306 and the individual-VCI counter 308. First, when the cell is input to the FIFO circuit 302, the number of cells of the corresponding VCI is counted up on the basis of the information of the output VCI 226 of the internal cell format 220 sent from the crossbar switch circuit 105 to the FIFO circuit 302. To the contrary, when the cell is output from the FIFO circuit 302, the number of cells of the corresponding VCI is counted down based on information of the output VCI 226. The current value of the number of cells of individual VCIs is sent to the VCI congestion level decision circuit 440 via a signal line 324.

The buffered-cell VCI number counter 310 indicates the number of VCIs whose cells are buffered in the FIFO circuit 302. It counts up when the value of the individual-VCI counter 308 changes from "0" to "greater than 0", and it counts down when the value changes from "greater than 0" to "0". The status of the buffered-cell VCI number counter 310 is sent to the congestion notification decision circuit 410 via a signal line 326.

Figure 4:
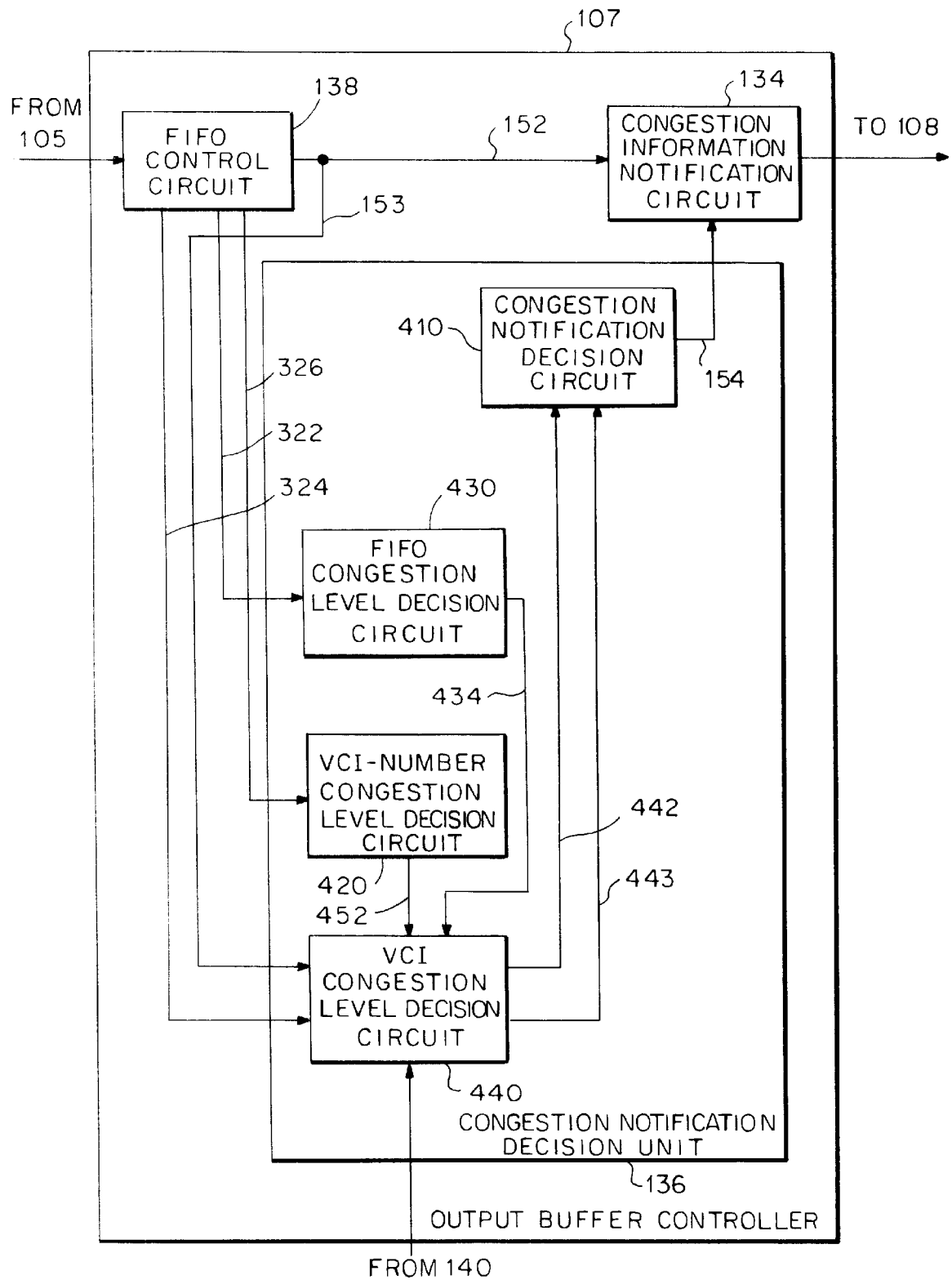
FIG. 4 is a block diagram for explaining an embodiment of an output buffer controller 107.

FIG. 4 is a block diagram of the output buffer controller 107 as well as the congestion notification decision unit 136. The congestion notification decision unit 136 includes the FIFO congestion level decision circuit 430 which decides the congestion of a FIFO level, a VCI-number congestion level decision circuit 420 which decides a congestion level based on the status of the buffered-cell VCI number counter 310, a VCI congestion level decision circuit 440 which decides the congestion of a VCI level, and a congestion notification decision circuit 410 which decides whether or not the congestion notification is to be executed based on the output signals of the FIFO congestion level decision circuit 430 and the VCI congestion level decision circuit 440. The congestion notification decision circuit 410 indicates whether congestion notification is to be executed by congestion marking indication signal line 154.

Figure 5:
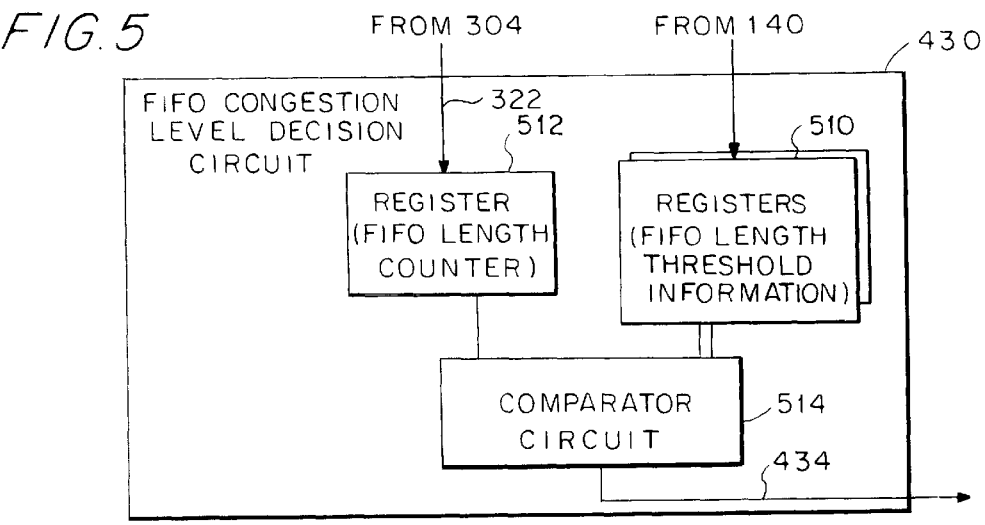
FIG. 5 is a block diagram for explaining a FIFO congestion level decision circuit 430;.

The FIFO congestion level decision circuit 430 shown in FIG. 5 includes a register 512 which holds the value of the FIFO length counter 304 therein, registers 510 each of which holds therein threshold information for deciding the FIFO congestion level, and a comparator 514 which compares the held information items and the compared result of which is output by a signal line 434. The information of each of the registers 510 has its value set by the CP 140. Herein, a plurality of threshold information items are held, and they indicate the degrees of congestion permitted. The output values of the signal line 434 indicating the degrees of congestion contain a non-congested state, a lightly-congested state and a heavily-congested state. Further, the lightly-congested state contains several levels.

Figure 6:
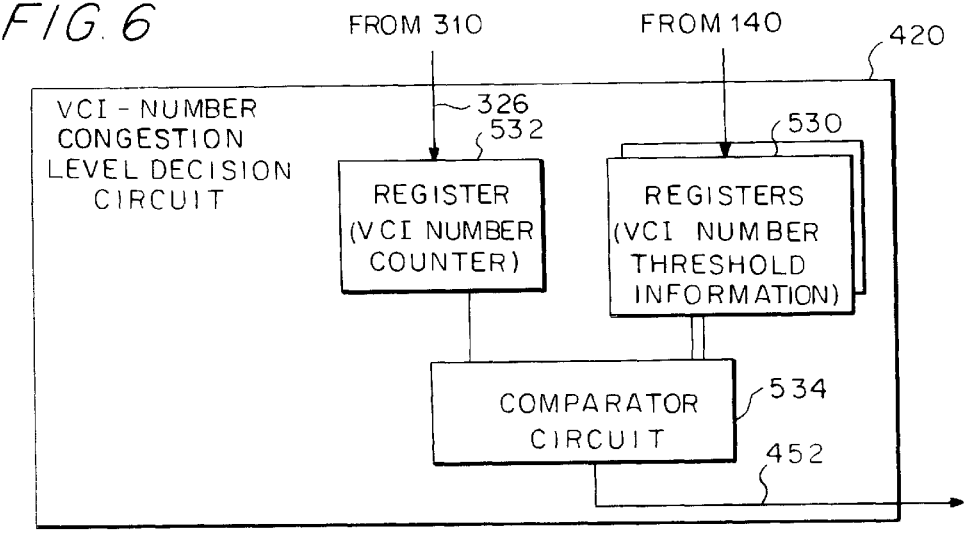
FIG. 6 is a block diagram for explaining a VCI-number congestion level decision circuit 420.

The VCI-number congestion level decision circuit 420 shown in FIG. 6 includes a register 532 which holds the value of the buffered-cell VCI number counter 310 therein, registers 530 each of which holds therein threshold information for deciding the buffered-cell VCI number congestion level, and a comparator 534 which compares the held information items and the compared result of which is output by a signal line 452. The information of each of the registers 530 has its value set by the CP 140. Herein, a plurality of threshold information items are held, and they indicate the degrees of congestion permitted.

Figure 7:
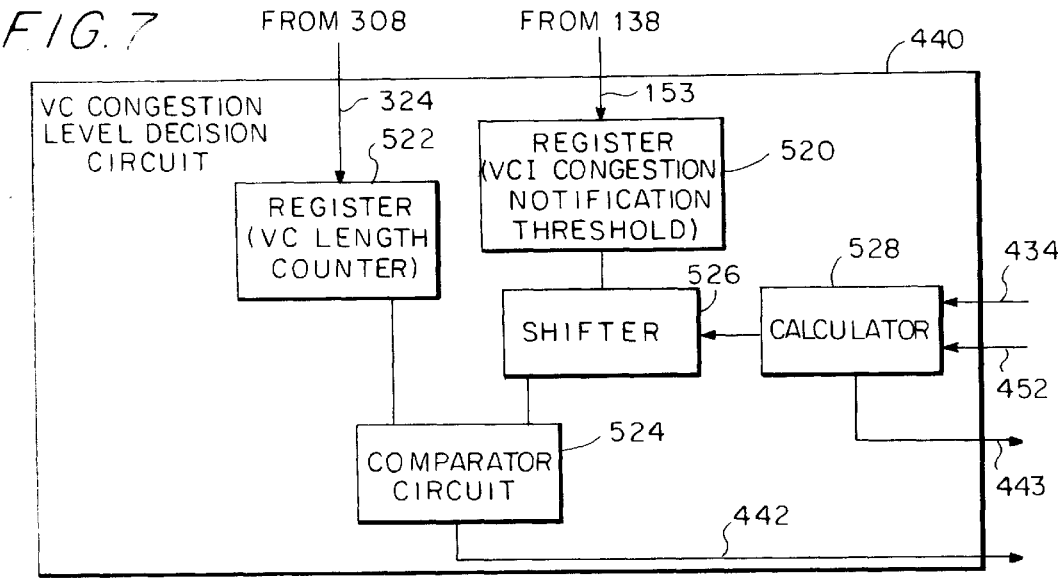
FIG. 7 is a block diagram for explaining a VCI congestion level decision circuit 440.

The VCI congestion level decision circuit 440 shown in FIG. 7 includes a register 522 which holds the value of the individual-VCI counter 308, a register 520 which holds therein threshold information for deciding the individual-VCI congestion level, a comparator 524 which compares the held information items, a shifter 526 and a calculator 528. The calculator 528 calculates the value F of the shift width of the shifter from the compared result signal 434 from the FIFO congestion level decision circuit 430 and the compared result signal 452 from the VCI-number congestion level decision circuit 420. The shifter 526 shifts the threshold information from the register 520 according to a value F output from the calculator 528 and supplies the shifted value to the comparator 524. The comparator 524 compares the shifted value from the shifter 526 to the value output from register 522 and outputs a result of comparison on a VC congestion degree line 442. Besides, the calculator 524 evaluates an index expressive of the degree of congestion of the whole FIFO and delivers the index to the congestion notification decision circuit 410 via a FIFO congestion degree signal line 443. Here, for the sake of brevity, the index is assumed the same as the value F of the shift width. Latched as the information of the register 520 is the value of the affixed header of the top cell delivered from the FIFO control circuit 153: the VCI-congestion notification threshold value 227.

Figure 8B:
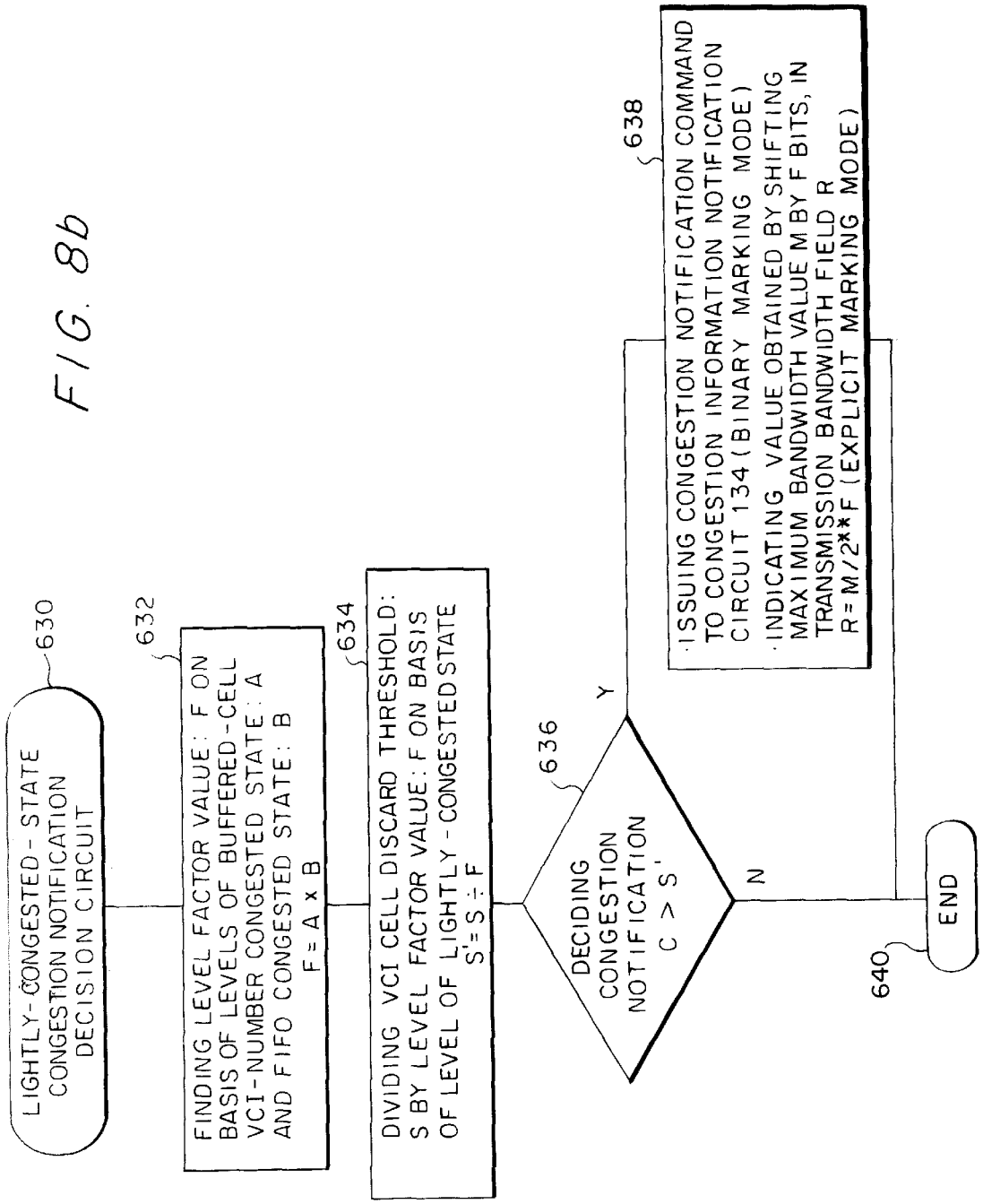

FIG. 8A illustrates the operations of the congestion notification decision circuit 410 and the congestion information notification circuit 134. The congestion notification decision circuit 410 decides any of the non-congested state, lightly-congested state and heavily-congested state in reply to the comparison signal 434 delivered from the FIFO congestion level decision circuit 430 (step 612). In a case where the lightly-congested state is exhibited, the circuit 410 gives a congestion notification command as illustrated in FIG. 8B in accordance with the compared result signal 442 delivered from the VCI congestion level decision circuit 440 (step 616). In case of a non-congested state, the circuit 410 does not give the congestion notification command irrespective of the compared result signal 442 (step 618), and in case of the heavily-congested state, it gives the congestion notification command irrespective of the compared result signal 442 (step 614). The congestion notification command is given on a signal line 154.

With respect to the binary marking mode, the congestion information notification circuit 134 having received the congestion notification command (at the step 614 or 616)

writes the congestion notification information into the binary marking field 243 of the bandwidth management cell 240 or into the binary marking field 213 in the cell header of the data cell (steps 614, 638).

With respect to the explicit marking mode, the congestion information notification circuit 134 receives the congestion notification command containing congestion degree information based on a signal line 443 from the VCI congestion level decision circuit 440 (at the step 614 or 616) and sends an explicit rate altering notification correspondent to the congested state, to the congestion information notification circuit 134. The congestion information notification circuit 134 having received the explicit rate altering notification writes a value obtained by shifting the maximum bandwidth value (denoted by M in FIG. 10) of the bandwidth management cell 240 in accordance with the altering notification, into the explicit rate marking field 243 (steps 614, 638). The write operation is performed only when the shifted value is smaller than the value of the explicit rate field 243 before the write operation. Since both the maximum bandwidth value and the explicit rate value are denoted by binary notation, the shift processing is a hardware implementation method of good cost/performance ratio. The explicit marking mode stated above computes a rate in simplified fashion and shall therefore be called the "simplified rate calculation method" herein.

FIG. 8B illustrates the operation of the VCI congestion level decision circuit 440 (in the case of step 616). The step 638, however, signifies the operations of the congestion notification decision circuit 410 and congestion information notification circuit 134 as stated above. The calculator 528 calculates the value F of the shift width of the shifter 526 from the compared result signal 452 indicative of the buffered-cell VCI number congestion state: A, and the compared result signal 434 indicative of the FIFO congestion state: B (step 632: F=A×B here). On the basis of the value F of the shift width, the shifter 526 shifts the value S of the register 520 obtained by latching the threshold value of the affixed header of the output cell: the VCI-congestion-notification threshold value 227 (step 734). The comparator 524 compares the shifted value S' with the value C of the register 532 which holds the value of the buffered-cell VCI number counter 310 therein (step 636). The result of the comparison is delivered to the congestion notification decision circuit 410 via a signal line 442. Simultaneously, the signal 443 containing the congestion degree information is sent to the congestion notification decision circuit 410, and the congestion notification reflecting the lightly-congested state is done in the case of the explicit marking mode (step 638).

In order to clarify the explanation of FIGS. 8A and 8B and FIG. 9 provides a table which illustrates the operation of the congestion decision notification circuit 410 in the case of the binary marking mode, and FIG. 10 provides a table which illustrates the operation of the congestion decision notification circuit 410 in the case of the explicit marking mode.

FIG. 9 provides a table having a plurality of entries which illustrate the behavior of the congestion notification circuit 410 when in the binary marking mode. In the binary marking mode congestion notification circuit 410 indicates to the congestion information notification circuit 134 whether to mark the CI (Congestion Indication) bit of the RM cell or not mark. When the terminal 162 receives the RM cell and when the CI bit is on terminal A 162 decreases its rate, and when the CI bit is off terminal A 162 increases its rate. When line 443 is in a non-congested state, line 154 indicates to the congestion information notification circuit 134 to not mark the RM cell indicating no rate decrease, independent of line 422. This is done because the FIFO is in a non-congested state and the probability of cell discard is very small. Refer to entry Nos. 1 and 2. When line 443 is in a lightly congested state, line 154 indicates to the congestion information notification circuit 134 to not mark the RM cell indicating no rate decrease, when the line 442 shows VC counter value C is equal or smaller than the VC threshold S'. This is done because the FIFO is in the lightly congested state by traffic on the VC is light. Thus, probability of cell discard is small. Refer to entry No. 3. When line 443 is in the lightly congested state, line 154 indicates to the congestion information notification circuit 134 to mark the RM cell indicating a rate decrease when line 442 shows VC counter value C is bigger than BC threshold S'. This is done because the FIFO is in a lightly congested state and traffic on the VC is heavy. Thus, the probability of cell discard is big. Refer to entry No. 4.

When line 443 is in the heavily congested state, line 154 indicates to the congestion information notification circuit 134 to mark the RM cell indicating a rate decrease, independent of the line 442. This is done because the FIFO is in the heavily congested state and the probability of cell discard is very big. Refer to entry Nos. 5 and 6.

FIG. 10 provides a table drawing a plurality of entries which illustrate behavior of the congestion notification circuit 410 when the simple implementation of the explicit marking mode. In the explicit marking mode, congestion notification circuit 410 indicates to the congestion information notification circuit 134 to put the acceptable rate in the ER (Explicit Rate) filed of the RM cell in congested states. When terminal A receives the RM cell and its ER field is smaller than PCR (Peak Cell Rate), the terminal A decreases its rate to the value of ER field.

In FIG. 10, the basic procedure of marking is almost the same as in FIG. 9. When line 443 is in the non-congested state, line 154 indicates to the congestion information notification circuit 134 not to change the ER field of the RM cell (if there is no switch between switch 100 and terminal A 162, the value is Peak Cell Rate: M), independent of the line 442. This is because the FIFO is in the non-congested state and the probability of cell discard is very small. Refer to entry Nos. 1 and 2.

When line 443 is in a light congested state, line 154 indicates to the congestion information notification circuit 134 not to change the ER field of the RM cell when the line 442 shows Vci counter value C is equal or smaller than VC threshold S'. This is because the FIFO is in a lightly congested state but traffic on the VC is light. Thus, probability of cell discard is small. Refer to entry No. 3.

When line 443 is in lightly congested state, line 154 indicates to the congestion information notification circuit 134 to change the ER field of RM cell to the value M/2F when line 442** shows VC counter value C is bigger than VC threshold S'. This is because the FIFO is in a lightly congested state and traffic on the VC is heavy. Thus, the probability of cell discard is bit. Further the heavier the FIFO is congested, the smaller the ER field value should be. Refer to entry No. 4.

When line 443 is in the heavily congested state, line 154 indicates to the congestion information notification circuit 134 to change the ER field of the RM cell to the value 0, independent of the line 442. This is because the FIFO is in heavily congested state and the probability of cell discard is very big. The terminal A 162 decreases its rate to the value of MCR (Minimum Cell Rate), when it receives the RM cell.

The value of PCR and MCR is set in the terminal A162 when connection is set up by PVC (Permanent Virtual Circuit) or SVC (Switched Virtual Circuit). Refer to entry Nos. 5 and 6.

FIG. 11 is a graph for explaining the congestion notification operation of every VCI in such a way that the state of a specified VCI is positioned with indexes being the threshold value of every connection in the lightly-congested state: S and the number of cells of every connection: C. When the FIFO has turned from the non-congested state into a lightly-congested state #1, the VCI lying in a state above a boundary line 700 (where the number of cells has exceeded a threshold value) is subjected to the congestion notification. As the degree of congestion of the FIFO heightens, the congested state thereof changes into lightly-congested states #2 and #3, and the extent of the state to undergo the congestion notification enlarges. As a result, recovery from the congested state is accelerated. As the FIFO recovers from the congestion, its congested state changes into the lightly-congested states #2 and #1 and the non-congested state.

Next, the fairness control and the bandwidth guaranteeing control between VCIs (=connections) will be explained. It is assumed that a connection L is in a state 701, that a connection M is in a state 702 and that a connection N is in a state 703. The connections L and M for which the fairness control is performed have their threshold values set to be equal. The connection M in which the number of buffered cells is beyond the boundary line 700 is subjected to the congestion notification earlier, whereby the bandwidth of the connection M is limited, and the control for recovering fairness can be performed. Besides, the connections L and N for which the bandwidth guaranteeing control is performed are equal in the number of buffered cells, but they have their threshold values set to be different. The connection N in which the number of buffered cells is beyond the boundary line 700 is subjected to the congestion notification earlier, whereby the control for guaranteeing the bandwidth of the connection L can be performed. In the non-congested state, the congestion notification is not done irrespective of whether or not each of the connections has exceeded the threshold value 700. Therefore, the bandwidth of transmission is not limited, and that of the line can be effectively used. Further, in the heavily-congested state, the congestion notification is done irrespective of whether or not each of the connections has exceeded the threshold value 700. Therefore, the transmission bandwidths of all the connections are limited, and the FIFO buffer can be effectively used so as not to cause cell discard.

As described above, in the case where the threshold values: S of the respective connections are set equal, the fairness between the connections can be initiated, and in the case where the more important connection is endowed with the larger threshold value: S, it can be set less prone to undergo the congestion notification, than the other connection.

In the above, as one embodiment of the present invention, there is a case where, upon the occurrence of the congested state in the whole output port in the switch, the cell is discarded based on the output of the comparator for the connection. However, an embodiment in which the concrete threshold values 238 in connection information 230 are substituted by logical sublevel values convertible into threshold values 520 by CP 140 can be similarly realized, and it demonstrates the effect of protecting the throughput of a connection of higher sublevel against a congested state having occurred in the switch. More specifically, in the congested state, a connection of lower sublevel is first subjected to congestion notification. When the degree of the congested state has further heightened in spite of the execution of the congestion notification, congestion notification is begun also for a connection of higher sublevel. As the switch recovers from the congested state, the congestion notifications are suspended in succession from the cell of the connection of higher sublevel.

The deciding of a congestion by way of a dedicated circuit such as the congestion notification decision unit has been described above as one embodiment of the present invention. However, the congestion decision can be rendered by applying a CPU, for example, that demonstrates a similar effect of recovery from the congestion. However, the use of a CPU causes the cost of the switch to rise. However, the processing line speed thereof lowers. Although the embodiment in which the level factor F of the step 632 and the shift value F of the step 638 have the same value as mentioned above, the level factor F and the shift value F need not always be the same value. By way of example, when the shift value is proportional to the level factor F (at, for example, ½), the effect of recovering from the congestion according to the degree of the congested state is demonstrated. Since these items depend upon the architecture of a network and the condition of traffic, they should desirably be alterable and adjustable in compliance with commands delivered from the network management device 140. Further, even when the shift value F is a fixed value, the effect of recovering from congestion is demonstrated for a certain range of congestion with a simple circuit arrangement though the function of recovering from the congestion degrades.

The construction described above includes the counter 308 of every VCI and the VCI congestion notification threshold 227 in the internal cell format, and the value of the counter 308 and the VCI congestion notification threshold 227 held in the register 520 are compared by the comparator circuit 524. However, a construction which does not include the VCI congestion notification threshold 227 can also be used. In this case, the threshold value of the comparison becomes a fixed value, and the fairness control can be initiated although the bandwidth guaranteeing control cannot be performed. A construction which does not include the counter 308 of every VCI can also be used. In this case, the counter value of the comparison becomes the value of the FIFO length counter, and the bandwidth guaranteeing control of somewhat low precision can be initiated.

A construction can also be used that includes neither is of the counter 308 of every VCI and the VCI congestion notification threshold 227 in the internal cell format, and in which the value of the FIFO length counter and a fixed threshold value are compared. In this case, although the fairness control or the bandwidth guaranteeing control cannot be indicated, an effective control can be performed for the congestion control by curtailing the indicated values of the explicit rate in accordance with the degrees of congestions.

The above description assumes that each of the switches in the network is a switch constructed according to the above-described embodiment of the present invention. However, other such switch constructions can be used in the network such that when part of the network is a switch constructed according to the present invention, the effect of protecting cells of high priority level against a congested state having occurred in the switch is demonstrated wherever the switch may lie.

The aspect of performance in which the buffer is one corresponding to the output port has been described as one embodiment of the present invention. However, the same effect is demonstrated when a buffer corresponding to the input buffer or buffers disposed on both the input and output sides is used. The aspect of performance in which the buffers correspond to the individual ports has been described as one embodiment of the present invention. However, the same effect is demonstrated when even a single buffer shared by a plurality of ports is used.

The example in which the switch of the network is a switch of N×N cells has been described above as one embodiment of the present invention. However, when a multiplexer of N inputs and one output or a rate conversion buffer of one input and one output are used, the present invention demonstrates the effect of protecting cells of high priority level against the occurrence of a congested state.

Now, an embodiment which incorporates the fair rate method of the explicit marking mode in which rates are fairly distributed among all VCIs transferring data, unlike the simplified rate method, will be described with reference to FIGS. 12, 13 and 14.

Figure 12:
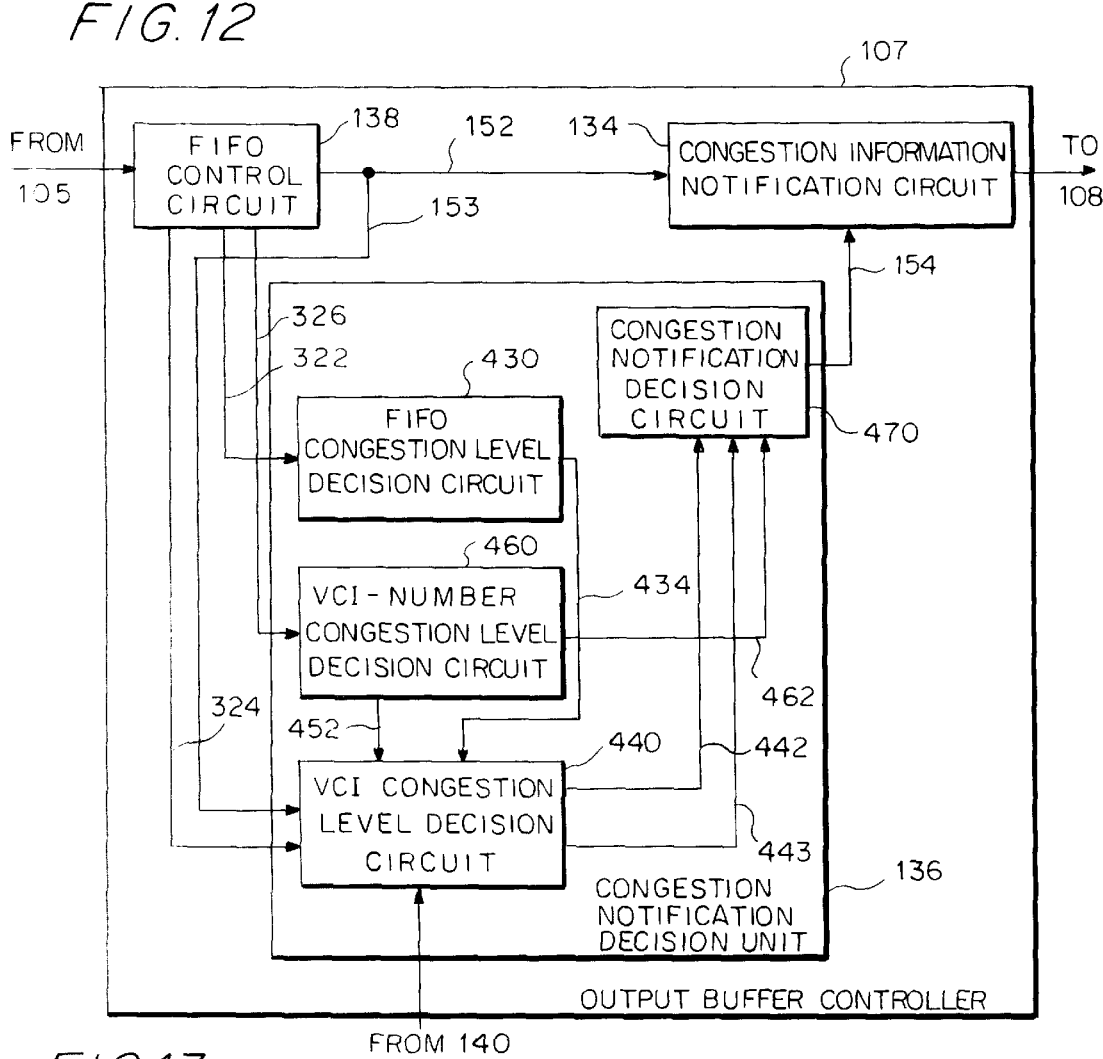
FIG. 12 is a block diagram for explaining an embodiment of a fair rate method for the output buffer controller 107.

FIG. 12 illustrates another embodiment of the output buffer controller 107 of the switch 100. The points of difference from the controller 107 in FIG. 4 are that the VCI-number congestion level decision circuit 420 is altered into a VCI-number congestion level decision circuit 460, while the congestion notification decision circuit 410 is altered into a congestion notification decision circuit 470, and that the fair rate of every VCI calculated by the VCI-number congestion level decision circuit 420 is delivered to the congestion notification decision circuit 470 by a signal line 462.

Figure 13:
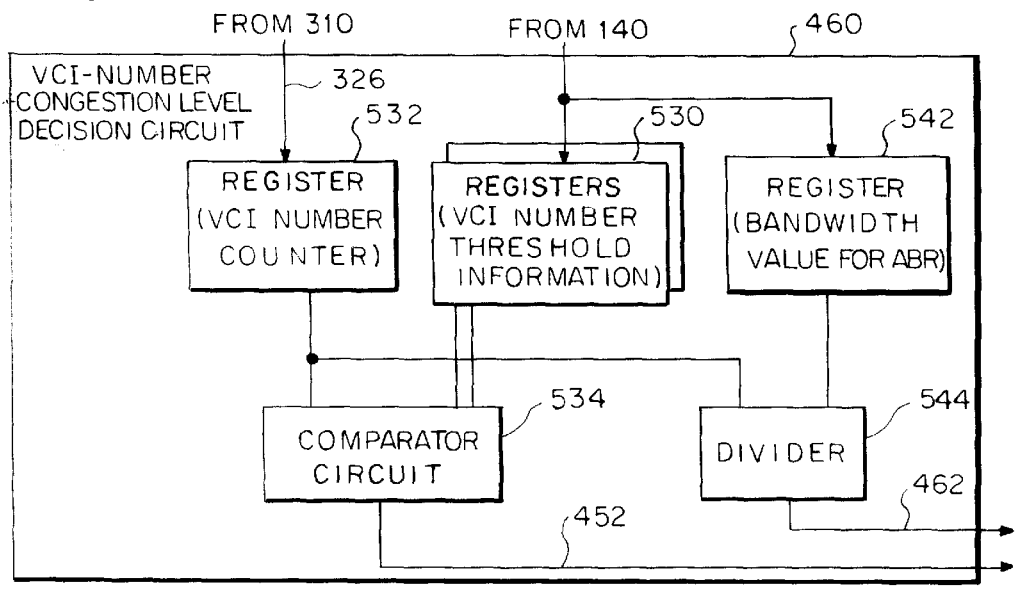
FIG. 13 is a block diagram for explaining an embodiment of the fair rate method for a VCI-number congestion level decision circuit 460.

FIG. 13 illustrates the arrangement of the VCI-number congestion level decision circuit 460. The points of difference from the VCI-number congestion level decision circuit 420 in FIG. 6 are that there are included a register 542 which holds the bandwidth value (denoted by U) of all the VCIs of the ABR traffic class therein, and a divider 544 which divides the value of the register 542 by the value of the counter 432. The value of register 542 is the number of those VCIs of ABR whose cells are currently retained in the cell buffer, that is, which are currently under active transfer. The result of the division (U/the number of the buffered-cell VCIs) indicating the fair rate of every VCI is output to the congestion notification decision circuit 470.

FIG. 14 provides a table having a plurality of entries which illustrate behavior of congestion notification circuit 470 when in the fare rate calculation implementation of the explicit marking mode. The congestion notification circuit 470 is indicated in the embodiment shown in FIG. 12. In fare rate calculation implementation, line 154 in FIG. 14 is different from line 154 in FIG. 10 with respect to entry No. 4. Available bandwidth U is (total ABR Bandwidth)−(total MCR). Fair rate is calculated by the expression: U/(active VC number).

Another expression at entry No. 4 is more useful, where: Wi/(summation of Weight of active VC)×U. wi is weight of marking VC. Then each VC can have each weight.

The point of difference from the operation in FIG. 10 is that the fair rate value (U/active VCI number) sent by the signal line 462 laid is adopted when the lightly-congested state has been decided and where the congestion decision of every VCI has resulted in the congestion (C>S). Refer to entry No. 4. On this occasion, the congestion notification decision circuit 470 transfers the fair rate value via the signal line 154, and the congestion information notification circuit 134 receives the transferred value. On condition that the fair rate value is smaller than the explicit rate value 245 of the internal cell format 220, the circuit 134 rewrites the value 245 into the fair rate value in the same manner as in the case of the simplified rate method.

In the fairness control, the value S, the congestion decision threshold 238 of every VCI is designated to be equal in all connections, for example, a value 0 for the sake of brevity. On this occasion, in the lightly-congested state, the fair rate value is always selected by the connections transferring data, and the upper limit of the total of the bandwidths of the connections of the ABR traffic class currently under data transfer is restricted to the value U, so that the state of the congestion does not worsen. Moreover, the congestion control is performed so that the bandwidths of all the connections may become equal.

When performing the bandwidth guaranteeing control, the value S (the congestion decision threshold 238 of every VCI) of the connection whose bandwidth is to be guaranteed is designated to be high for example, a value H as compared with the value for example, a value 0 for the sake of brevity of the other connections of low priority. On this occasion, in the lightly-congested state, the fair rate value is always selected by the low priority connections, and the connection whose bandwidth is to be guaranteed can transfer data at the maximum rate subject to C×S': within the limits in which the congestion decision of every VCI result in the congestion. Thus, the bandwidth is guaranteed. When the degree of congestion of the FIFO has heightened, the value F enlarges. Therefore, the inequality C×S' fails to hold, and the connection set at the high priority level in order to guarantee the bandwidth is also limited to the fair rate. However, the time period of the high priority connection during which the bandwidth is guaranteed can be made sufficiently long relative to that of the low priority connections.

In the above, the method of calculating the fair bandwidth has been stated as the different embodiment of the present invention. However, even with a construction which lacks in the acceleration of the VC-level congestion decision (step 634) implemented by the shifter 526 (i. e., in which the output of the register 520 enters the comparator 524 directly), a similar effect is demonstrated although the fineness of the congestion control decreases. Also, a construction in which the congestion notification decision circuit 410 does not consider the congestion decision of the FIFO level rendered with the value of the signal line 443 (i. e., which do not perform the operations coping with the heavily-congested and non-congested states in FIGS. 9 and 10) demonstrates a similar effect although the fineness of the congestion control decreases still more. A construction which does not include the VCI congestion level decision circuit 440 (i. e., which lacks in the operations coping with the heavily-congested and non-congested states in FIGS. 9 and 10 and in the operation of the condition C×S' coping with the lightly-congested state, in other words, which always indicates only the fair rate) demonstrates a similar effect although an excessive congestion control acts to suppress the effective utilization of the line bandwidth.

Figure 15:
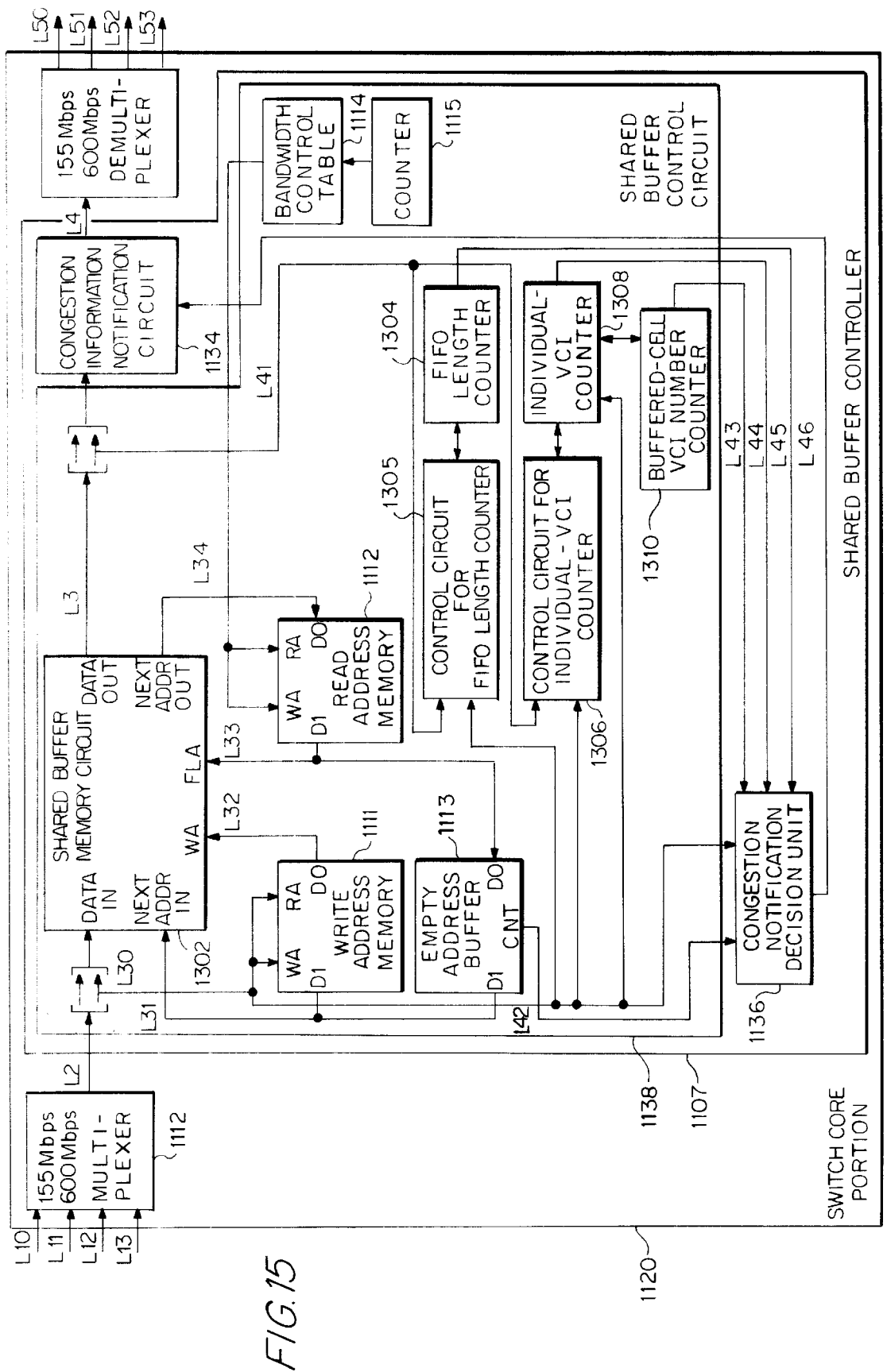
FIG. 15 is a block diagram of another embodiment of the present invention conforming to a shared buffer method.

Thus far, examples of constructions corresponding to the individual output buffers have been described. Next, an embodiment of an ABR congestion control function for a switch of shared buffer construction in which a cell buffer is shared by a plurality of ports will be described with reference to FIG. 15.

Numeral 1120 denotes a switch core portion which is the principal part of the ATM switch conforming to the shared buffer method. Although the portions 108 associated with the output lines as shown in FIG. 1 are inserted in respective output lines L50~L53, they are omitted from the illustration. The switch core portion 1120 replaces the switch core portion 120 of the switch 100 shown in FIG. 1. By way of example, it is configured of a multiplexer 1112 of 155 Mbps/600 Mbps connected to input lines L10~L13, a demultiplexer 1113 of 600 Mbps/155 Mbps connected to the output lines L50~L53, and a shared buffer controller 1107. The shared buffer controller 1107 includes a shared buffer control circuit 1138 which is used in common by a plurality of line association portions, instead of the FIFO control circuits 138 distributively located in the respective output buffer controllers 107 in FIG. 1, a congestion notification decision unit 1136 which is used in common by a plurality of line association portions, instead of the congestion notification decision units 136; and a congestion information notification circuit 1134 which is used in common by a plurality of line association portions, instead of the congestion information notification circuits 134.

The shared buffer control circuit 1138 is constituted by a shared buffer memory 1302; a write address memory 1111, a read address memory 1112, an empty address buffer 1113, a bandwidth control table 1114 and a counter 1115 which control the shared buffer memory, and an individual-VCI-counter control circuit 1306, an individual-VCI counter 1308, a FIFO-length-counter control circuit 1305, a FIFO length counter 1304 and a buffered-cell VCI counter 1310.

Input cells subjected to header conversion by an input-line association portion (not shown) are supplied from the input lines L10~L13 to the multiplexer 1112, and are delivered as a time-serial cell array from a line L2. The basic construction and operation of the switch core portion 1120 shown here are similar to those stated in the official gazette of Japanese Patent Application Laid-open No. 276943/1992. The operations of writing cells into and reading cells out of the shared buffer memory 1302 are controlled by the write address memory 1111, read address memory 1112, empty address buffer 1113, bandwidth control table 1114 and counter 1115.

In a cycle of writing cells, output port information (routing information) affixed to a header part is extracted from each of the cells delivered from the multiplexer 1112 to the line L2. The write address memory 1111 is accessed using the extracted information as an address, and an address read out is afforded as a write address WA to the shared buffer memory 1302 through a line L32. On this occasion, an empty address to be utilized as a pointer address for the next cell is fetched from the empty address buffer 1113 storing the empty addresses of the shared buffer memory 1302 therein, and the fetched address is afforded as input data to the write address memory 1111 and shared buffer memory 1302 through a line L31.

The pointer address replaces the write address WA of the current cycle and is written into the same memory area within the write address memory 1111, and it becomes a new write address WA for the shared buffer memory 1302 when the next cell directed to the same port has arrived. On the other hand, the pointer address written into the shared buffer memory 1302 in a pair with the input cell is read out of the shared buffer memory 1302 in a pair with the cell and then held in the read address register 1112 in a cell reading cycle to be stated later. Thus, each time the cell is read out, the pointer address which points to the cell to be read out in the next cycle is stored in the read address register 1112 in correspondence with the output port, and a chained queue (list structure) which is logically connected by the next addresses is formed in correspondence with the output ports within the shared buffer memory 1302.

In each of the cell read cycles alternating with the cell write cycles, the bandwidth control table 1114 is accessed using as an address the output value (count value) of the counter 1112 which performs a count-up operation every cell read cycle. The count value corresponds to that output port of the cell selected which is selected by the demultiplexer 1113, and an address for designating a specified chained queue from which the cells are to be read out is previously stored in the bandwidth control table 1114 in correspondence with the count value.

The queue address read out of the bandwidth control table 1114 is afforded to the read address memory 1112 as a read address (RA) and a write address (WA), and a pointer address pointing to the top cell of the specified chained queue is read out of the address memory 1112. The pointer address is afforded as a read address to the shared buffer memory 1302 through a line L33, whereby the top cell of the specified chained queue is read out. The pointer address becomes an empty address upon the completion of the read-out of the cell from the shared buffer memory, so that it is stored in the empty address buffer 1113 through the line L33. On this occasion, the next pointer address in a pair with the cell has been read out of the shared buffer memory 1302, and it is written as a new pointer address into the read address memory 1112.

Owing to the above operations, in the shared buffer memory control circuit 1138, a new cell is added to the tail of any chained queue every write cycle, and the top cell of any chained queue is fetched every read cycle unless the designated chained queue is empty. In the cycle for writing the cell into the shared buffer 1302, the individual-VCI-counter control circuit 1306 counts up that cell count value in the individual-VCI counter 1308 which corresponds to the VCI information received from a line L30. To the contrary, in the cycle for reading the cell out of the shared buffer, the control circuit 1306 counts down that cell count value in the individual-VCI counter 1308 which corresponds to the VCI information received from a line L41. When supplied from the line L41 with the VCI information of the cell read out of the shared buffer memory circuit 1302, the individual-VCI counter 1308 delivers the corresponding cell count value to a line L44.

In the cycle for writing the cell into the shared buffer 1302, the FIFO-length-counter control circuit 1305 counts up that cell count value of each individual port in the FIFO length counter 1304 which corresponds to the port information received from the line L30. To the contrary, in the cycle for reading the cell out of the shared buffer, the control circuit 1305 counts down that individual-port cell count value in the FIFO length counter 1304 which corresponds to the port information received from the line L41. The cell count value of every port, that is, the value of the FIFO length is transferred to the congestion notification decision unit 1136 through a line L45.

The congestion notification decision unit 1136 has a function and a structure similar to those of the FIFO congested-state decision circuit 136 of the switch core portion shown in FIG. 1. The decision unit is supplied with the buffer use quantity of every port via the line L45 from the FIFO length counter 1304, the number of buffered cells of every VCI via the line L44 from the individual-VCI counter 1308, and the number of buffered-cell VCIs via a line L43 from the buffered-cell VCI number counter 1310. The result of the congestion decision is sent via a signal line L46 to the congestion information notification circuit 1134, which operates similarly to the congestion information notification circuit 134 in FIG. 1.

In the FIFO control circuit 430 in FIG. 3, the capacity of the FIFO 302 is the maximum value of the FIFO length counter 304. In contrast, in the case of the FIFO length counter 1304, a value which is greater than a value obtained by dividing the capacity of the whole shared buffer memory 11 by the number of ports can be set as the set value of the FIFO length threshold register 510 corresponding to the buffer use quantity of every port, and this brings forth the advantage that a buffer utilization factor at the occurrence of congestion can be enhanced. Further, each of the congestion notification decision unit 1136 and the congestion information notification circuit 134 can be shared by a plurality of output ports, so that the effect of reducing the cost of the switch is brought forth. Since, however, the readout of cells needs to be made higher in speed than in the switch 100 of the individual-buffer method, the limit of a switching speed tends to lower.

There has been described the case where the threshold information of every connection is set by the terminal-A at the time of setting the connection. However, information to be set by the terminal-A may be one convertible into the threshold information, and the format of the information is not especially restricted.

The case where the threshold information of every connection is set at the time of setting the connection by the network management device 180 has been described as one embodiment of the present invention. However, it is possible to similarly realize a case where, during the management of the connection, the threshold information mentioned above and information items on the number of transferred cells and the number of queued cells and the number of discarded cells are sent out in reply to a query made from the network management device 180 to the switch 100, and where they are tune up the threshold information in compliance with a resetting command given by the network management device 180. This produces a great effect in the network management.

As described above, according to the present invention, when a congested state has occurred in a cell switch, congestion notification is performed based on the threshold information of every connection having been set at the time of setting a connection. More specifically, when the threshold information items of respective connections are set equal, the connection in which more cells are buffered is preferentially subjected to the congestion notification when congestion has occurred, whereby a control directed toward the fair utilization of bandwidths among the connections can be performed.

When the threshold information of every connection is set with a priority level, the cell of the connection of lower priority level is preferentially subjected to the congestion notification, and hence, an excellent effect is produced that the bandwidth of the connection of higher priority level can be secured.

The present invention causes the above excellent effect that a congestion control can be performed on the basis of the congested state of the whole output port. More specifically, when the output port is in the congested state, the congestion notification is done on the basis of the threshold information of every connection, so that cell discard does not take place. In the non-congested state of the output port, processes such as a comparison with the threshold value of every connection and the congestion notification are not executed, so that the transmission rate of a transmission terminal is not suppressed, and a high throughput can be realized. This control brings forth the excellent effect that the effective utilization of a buffer is permitted in the non-congested state.

According to the present invention, after the setting of the connection, a fine congestion control can be realized merely with a comparatively small amount of hardware resources, to produce the excellent effects that a high-speed line can be coped with and that a cost required for the congestion control can be reduced.

While the present invention has been described in detail and pictorially in the accompanying drawings it is not limited to such details since many changes and modifications recognizable to those of ordinary skill in the art may be made to the invention without departing from the spirit and the scope thereof.

What is claimed is:

1. A packet switch for setting a connection between a transmission source of a packet and a reception destination thereof so as to perform communication, comprising:

a packet buffer which includes at least one input port and a plurality of output ports, wherein an input packet from the input port is delivered to at least one output port in accordance with address information of the input packet and connection information having been set in the packet switch at the time of setting the connection between the transmission source and the reception destination, and wherein a bandwidth management packet for giving notice of a congested state of the packet switch is transferred on the connection;

a register which holds threshold value information for indicating an amount of use of said packet buffer that causes congestion;

a counter which provides a count representative of a current amount of use of said packet buffer;

a comparator which compares said count from said counter and said threshold value information from said register and outputs a result of the comparison; and a congestion decision/notification circuit which writes congestion notification information into the bandwidth management packet when the result of the comparison indicates that the count exceeds said threshold value information and does not write congestion notification information into the bandwidth management packet when the result of the comparison indicates that the count does not exceed said threshold value information, wherein said register holds threshold value information for each connection and said counter provides a count representative of a current amount of use of said packet buffer per connection.

2. A packet switch according to claim 1, further comprising:

a portion associated with said input port;

a switch core portion; and a portion associated with said output ports, wherein an output packet queue is formed in said switch core portion said is shared by said output ports, and wherein said threshold value information is set in said packet switch from said transmission source by connection setting information at the time of setting said connection.

3. A packet switch according to claim 1, further comprising:

a portion associated with said input ports;

a switch core portion; and a portion associated with said output ports, wherein an output packet queue is formed in said switch core portion in associated with each of said output ports, and wherein said threshold value information is set in said packet switch from said transmission source by connection setting information at the time of setting said connection.

4. A packet switch according to claim 1, further comprising:

a portion associated with said input port;

a switch core portion; and a portion associated with said output ports, wherein an output packet queue is formed in said switch core portion said is shared by said output ports, and wherein said threshold value information is set in said packet switch from a network management terminal.

5. A packet switch according to claim 1, further comprising:

a portion associated with said input ports;

a switch core portion; and a portion associated with said output ports, wherein an output packet queue is formed in said switch core portion in associated with each of said output ports, and wherein said threshold value information is set in said packet switch from a network management terminal.

6. A packet switch according to claim 1, further comprising:

a portion associated with said input port;

a switch core portion; and a portion associated with said output ports, wherein an output packet queue is formed in said switch core portion said is shared by said output ports, and wherein said threshold value information and information on the number of discarded packets per connection are sent out in reply to a query from a network management device which is connected to said packet switch.

7. A packet switch according to claim 1, further comprising:

a portion associated with said input ports;

a switch core portion; and a portion associated with said output ports, wherein an output packet queue is formed in said switch core portion in associated with each of said output ports, and wherein said threshold value information and information on the number of discarded packets per connection are sent out in reply to a query from a network management device which is connected to said packet switch.

8. A packet switch according to claim 1, wherein a header part of the data packet is used to hold said congestion notification information.

9. A packet switch according to claim 1, wherein the bandwidth management packet is provided with a plurality of portions, one of which is used for holding said binary congestion notification information.

10. A packet switch according to claim 1, wherein the bandwidth management packet is divided into a plurality of portions one of which is used for holding information as to the allowed transmission rate.

11. A packet switch according to claim 1, wherein said register holds threshold value information for each connection.

12. A packet switch for setting a connection between a transmission source of a packet and a reception destination thereof so as to perform communication, comprising:

a packet buffer which includes at least one input port and a plurality of output ports, wherein an input packet from the input port is delivered to at least one output port in accordance with address information of the input packet and connection information having been set in the packet switch at the time of setting the connection between the transmission source and the reception destination, and wherein a bandwidth management packet for giving notice of a congested state of the packet switch is transferred on the connection;

a first counter which provides a first count representative of a current amount of use of said packet buffer per connection;

a first register which holds first threshold value information for indicating an amount of use of said packet buffer per connection that causes congestion;

a first comparator which compares said first count and said first threshold value information;

a second counter which provides a second count representative of a current amount of use of said packet buffer;

a second register which holds second threshold value information for indicating an amount of use of said packet buffer;

a second comparator which compares said second count and said second threshold value information; and congestion decision/notification circuit which writes congestion notification information into the bandwidth management packet based on results of comparisons performed by said first and second comparators.

13. A packet switch according to claim 12, wherein said congestion notification/decision circuit writes congestion notification information into the bandwidth management packet when a result of the comparison by said second comparator indicates said second count exceeds said second threshold value information and a result of the comparison by said first comparator indicates the first count exceeds the first threshold value information.

14. A packet switch according to claim 12, wherein said congestion notification/decision circuit does not write congestion notification information into the bandwidth management packet when a result of the comparison by said second comparator indicates said second count does not exceed said second threshold value information irrespective of a result of the comparison by said first comparator.

15. A packet switch according to claim 12, wherein said packet switch operates in one of a plurality of states including at least a lightly congested state and a heavily congested state, wherein said first threshold value information in said first register is weighted in accordance with said states, wherein when said first comparator determines based on the weighted information that said lightly congested state exists, said congestion notification/decision circuit writes said congestion notification information into the bandwidth management packet based on a result of the comparison by said first comparator, and wherein when said first comparator determines based on the weighted information that said heavily congested state exists, said congestion decision/notification circuit writes said congestion notification information into the bandwidth management packet without regard to the comparison by said first comparator.

16. A packet switch according to claim 12, further comprising:
- a third counter which provides a third count representative of the number of connections having packets which are being held in said packet buffer;
- a third register which holds third threshold value information for indicating the number of connections in which packets are held in said packet buffer that causes congestion; and
- a third comparator which compares said third count and said third threshold value information,
- wherein said packet switch operates at a plurality of states including a lightly congested state and a heavily congested state according to a result of the comparison performed by said third comparator.

17. A packet switch according to claim 12, wherein a header part of the bandwidth management packet is used to hold said congestion notification information.

18. A packet switch according to claim 12, wherein the bandwidth management packet is provided with a plurality of portions, one of which is used for holding data.

19. A packet switch according to claim 12, wherein the bandwidth management packet is divided into a plurality of portions one of which is used for holding data and another of which is used for holding information as to the allowed transmission rate.

20. A packet switch for setting a connection between a transmission source of a packet and a reception destination thereof so as to perform communication, comprising:
- a packet buffer which includes at least one input port and a plurality of output ports, wherein an input packet from the input port is delivered to at least one output port in accordance with address information of the input packet and connection information having been set in the packet switch at the time of setting the connection between the transmission source and the reception destination and in accordance with maximum bandwidth information included in said connection information, and wherein a bandwidth management packet for giving notice of a congested state of the packet switch is transferred on the connection;
- a congestion decision circuit for deciding whether a congestion exists in said packet buffer; and
- a congestion decision notification circuit for writing congestion notification information, obtained by dividing the maximum bandwidth information by a power of 2, into the bandwidth management package when said congestion decision circuit indicates a congestion exists in said packet buffer and not writing the congestion notification information in the bandwidth management packet when the congestion decision circuit indicates that a congestion does not exist in said packet buffer.

21. A packet switch for setting a connection between a transmission source of a packet and a reception destination thereof so as to perform communication, comprising:
- a packet buffer which includes at least one input port and a plurality of output ports wherein an input packet from the input port is delivered to at least one output port in accordance with address information of the input packet and connection information having been set in the packet switch at the time of setting the connection between the transmission source and the reception destination, wherein a bandwidth management packet for giving notice of a congested state of the packet switch is transferred on the connection, and wherein allowed transmission bandwidth information for indicating a transmission bandwidth of the transmission source is included as congestion notification information in the bandwidth management packet;
- a counter which provides a count representative of the number of connections for which packets are being held in said packet buffer;
- a register which holds target bandwidth value information for indicating an output bandwidth at said one output port;
- a divider which divides said target bandwidth value information by said count from said counter; and
- a target bandwidth notification circuit for writing an output of said divider as the allowed transmission bandwidth information into the bandwidth management packet.

22. A packet switch according to claim 21, wherein a header part of the bandwidth management packet is used to hold said congestion notification information.

23. A packet switch according to claim 21, wherein the bandwidth management packet is provided with a plurality of portions, one of which is used for holding data.

24. A packet switch according to claim 21, wherein the bandwidth management packet is divided into a plurality of portions one of which is used for holding data and another of which is used for holding information as to the allowed transmission rate.

25. A packet switch for setting a connection between a transmission source of a packet and a reception destination thereof so as to perform communication, comprising:
- a packet buffer which includes at least one input port and a plurality of output ports, wherein an input packet from the input port is delivered to at least one output port in accordance with address information of the input packet and connection information having been set in the packet switch at the time of setting the connection between the transmission source and the reception destination, wherein a bandwidth management packet for giving notice of a congested state of the packet switch is transferred on the connection and wherein allowed transmission bandwidth information for indicating a transmission bandwidth of the transmission source is included as congested state information in the bandwidth management packet,
- wherein terminal transmission rate information of the transmission source is held in a data part of the bandwidth management packet for use by said packet switch;
- a counter which provides for each connection a count representative of an amount of use of said packet buffer per connection;
- a register which holds for each connection threshold value information for indicating an amount of use of said packet buffer per connection that causes congestion;
- a comparator which compares for each connection said count and said threshold value information; and
- a target bandwidth notification circuit, when a result of the comparison by the said comparator indicates the count exceeds said threshold value information, for comparing the terminal transmission rate information with transmission bandwidth information of the transmission source and writing a higher of the two values as the allowed transmission bandwidth information into the bandwidth management packet, and when the result of the comparison by said comparator indicates that the count does not exceed the threshold value information, for writing the allowed transmission bandwidth information in said bandwidth management packet without alteration.

26. A packet switch according to claim 25, wherein a header part of the bandwidth management packet is used to hold said congestion notification information.

27. A packet switch according to claim 25, wherein the bandwidth management packet is provided with a plurality of portions, one of which is used for holding data.

28. A packet switch according to claim 25, wherein the bandwidth management packet is divided into a plurality of portions one of which is used for holding data and another of which is used for holding information as to the allowed transmission rate.

29. A packet switch according to claim 25, wherein said packet switch operates at a plurality of states including at least a lightly congested state and a heavily congested state,
wherein said threshold value information in said register is weighted in accordance with said states, and
wherein when said comparator determines, based on the weighted information, that said lightly congested state exists, said comparator compares the weighted information with said count of said counter.

30. A packet switch according to claim 25, further comprising:
a portion associated with said input port;
a switch core portion; and
a portion associated with said output ports,
wherein an output packet queue is formed in said switch core portion and is shared by said output ports.

31. A packet switch according to claim 25, further comprising:
a portion associated with said input ports;
a switch core portion; and
a portion associated with said output ports,
wherein an output packet queue is formed in said switch core portion in associated with each of said output ports.

32. A packet switch according to claim 30, wherein said threshold value information is set in said packet switch from said transmission source by connection setting information at the time of setting said connection.

33. A packet switch according to claim 31, wherein said threshold value information is set in said packet switch from said transmission source by connection setting information at the time of setting said connection.

34. A packet switch according to claim 30, wherein said threshold value information is set in said packet switch from a network management terminal.

35. A packet switch according to claim 31, wherein said threshold value information is set in said packet switch from a network management terminal.

36. A packet switch according to claim 30, wherein said threshold value information and information on the number of discarded packets per connection are sent out in reply to a query from a network management device which is connected to said packet switch.

37. A packet switch according to claim 31, wherein said threshold value information and information on the number of discarded packets per connection are sent out in reply to a query from a network management device which is connected to said packet switch.

38. A packet switch for setting a connection between a transmission source of a packet and a reception destination thereof so as to perform communication, comprising:

a packet buffer which includes at least one input port and a plurality of output ports, wherein an input packet from the input port is delivered to at least one output port in accordance with address information of the input packet and connection information having been set in the packet switch at the time of setting the connection between the transmission source and the reception destination, and wherein a bandwidth management packet for giving notice of a congested state of the packet switch is transferred on the connection;

a register which holds threshold value information for indicating an amount of use of said packet buffer that causes congestion;

a counter which provides a count representative of a current amount of use of said packet buffer;

a comparator which compares said count from said counter and said threshold value information from said register and outputs a result of the comparison;

a congestion decision/notification circuit which writes congestion notification information into the bandwidth management packet when the result of the comparison indicates that the count exceeds said threshold value information and does not write congestion notification information into the bandwidth management packet when the result of the comparison indicates that the count does not exceed said threshold value information;

a second counter which provides a second count representative of an amount of use of said packet buffer;

a second register which holds second threshold value information indicating an amount of use of said packet buffer that causes congestion; and a second comparator which compares said second count and said second threshold value information, wherein said threshold value information held in said register is set to "0" when a result of the comparison by said second comparator indicates a non-congested state.

39. A method of controlling congestion at a packet switch for setting a connection between a transmission source of a packet and a reception destination thereof so as to perform communication, wherein the packet switch includes a switch having at least one input port and a plurality of output ports, said packet switch switches an input packet from the input port to at least one output port in accordance with address information of the input packet and connection information having been set in said packet switch at the time of setting the connection between the transmission source and the reception destination, and transfers a bandwidth management packet for giving notice of a congested state of the packet switch on the connection, said method comprising the steps of:

providing for each connection threshold values of respective connections;

counting for each connection the number of packets buffered in the switch;

comparing for each connection the count with the threshold value per connection; and writing congestion notification information into the bandwidth management packet when the result of the comparison indicates that the count exceeds the threshold value and not writing congestion notification information into the bandwidth management packet when the result of the comparison indicates that the count does not exceed the threshold value.

40. A method according to claim 39, wherein the threshold values are set equal.

41. A method of controlling congestion at a packet switch for setting a connection between a transmission source of a packet and a reception destination thereof so as to perform communication, wherein said packet switch includes a switch having at least one input port and a plurality of output port, said packet switch switches an input packet from the input port to at least one output port in accordance with address information of the input packet and connection information having been set in said packet switch at the time of setting the connection between the transmission and the reception destination, and transfers a bandwidth management packet for giving notice of a congested state of the packet switch on the connection, said method comprising:

- a first step of providing a first count representative of a current amount use of a packet buffer included said packet switch per connection;
- a second step of holding first threshold value information for indicating an amount of use of the packet buffer per connection that causes congestion;
- a third step of comparing said first count and said first threshold value information;
- a fourth of providing a second count representative of a current amount of use of the packet buffer;
- a fifth step of holding second threshold value information for indicating an amount of use of the packet buffer;
- a sixth step of comparing said second count and said threshold value information; and
- a seventh step of writing congestion notification information into a bandwidth management packet based on results of comparison performed by said third and sixth steps.

42. A method according to claim 41, wherein the threshold values are set equal.

* * * * *